United States Patent [19]

Sakata et al.

[11] Patent Number: 5,016,114
[45] Date of Patent: May 14, 1991

[54] DIGITAL COPIER APPARATUS WITH EXTERNAL LASER CARD STORAGE MEDIUM AND IMAGE COMPRESSION VARIABLE WITH AVAILABLE MEMORY

[75] Inventors: Seiji Sakata, Yokohama; Tamotsu Harada, Tokyo; Norifumi Ito; Masayuki Hayashi, both of Kawasaki; Tsuyoshi Yoshimura, Tokyo; Nobuyuki Koinuma, Yokohama, all of Japan

[73] Assignee: Ricoh Company, Ltd., Tokyo, Japan

[21] Appl. No.: 131,004

[22] Filed: Dec. 8, 1987

[30] Foreign Application Priority Data

Dec. 9, 1986 [JP] Japan .............................. 61-293872

[51] Int. Cl.⁵ ............................................. H04N 1/40
[52] U.S. Cl. .................................... 358/404; 358/401; 358/449; 358/451
[58] Field of Search ............... 358/256, 290, 293, 285, 358/296, 257, 401, 404, 449, 451

[56] References Cited

U.S. PATENT DOCUMENTS

| | | | |
|---|---|---|---|
| 4,240,119 | 12/1980 | Norton | 358/256 |
| 4,249,216 | 2/1981 | Kanda | 358/257 |
| 4,300,169 | 11/1981 | Sato | 358/256 |
| 4,419,697 | 12/1983 | Wada | 358/257 |
| 4,491,874 | 1/1985 | Yamamoto | 358/296 |
| 4,544,956 | 10/1985 | Shimizu | 358/296 |
| 4,581,656 | 4/1986 | Wada | 358/293 |
| 4,658,299 | 4/1987 | Tanaka | 358/256 |
| 4,731,658 | 3/1988 | Koseki | 358/287 |
| 4,734,565 | 3/1988 | Pierce | 358/454 |

Primary Examiner—Edward L. Coles, Sr.
Assistant Examiner—Jerome Grant
Attorney, Agent, or Firm—Cooper & Dunham

[57] ABSTRACT

A digital copier using a laser card or like external storing medium for storing image data. A remaining amount of memory capacity of a laser card is displayed in terms of the number of papers of a particular size or by percent. Based on the remaining amount of capacity, image data are compressed and reduced, the reduction ratio being also recorded in the card. When the contents of a series of documents cannot be accommodated in a single card, the first card is provided with a mark which shows that the second card is to follow.

18 Claims, 34 Drawing Sheets

FIG. 15B
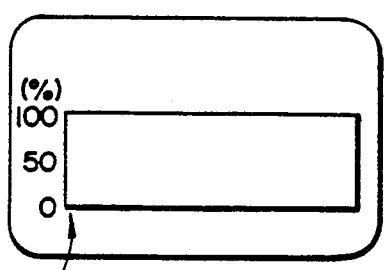
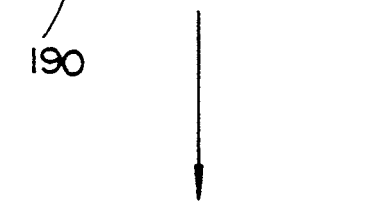
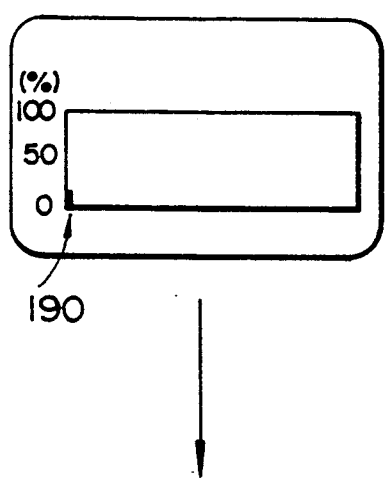
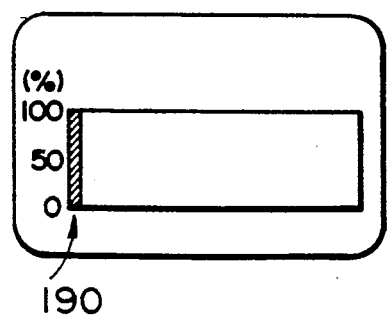

BUNSYOU 1 ——————— MAKE.PAG
BUNSYOU 2            ├─ DATA 1
BUNSYOU 3            ├─ DATA 2
                     └─ DATA 3

*FIG.43A* *FIG.43B*
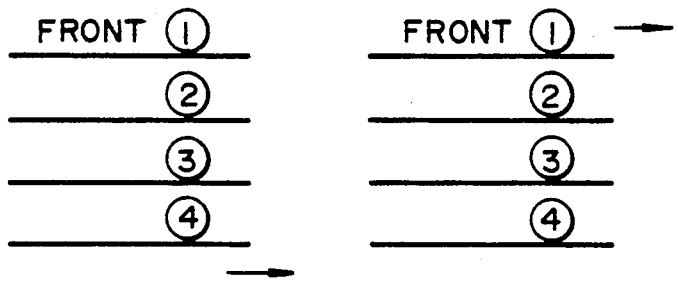
*FIG.43C* *FIG.43D*
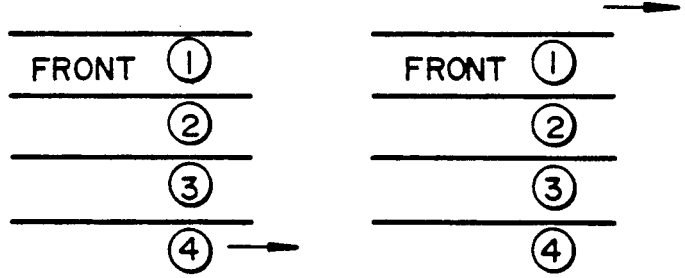
*FIG. 44*
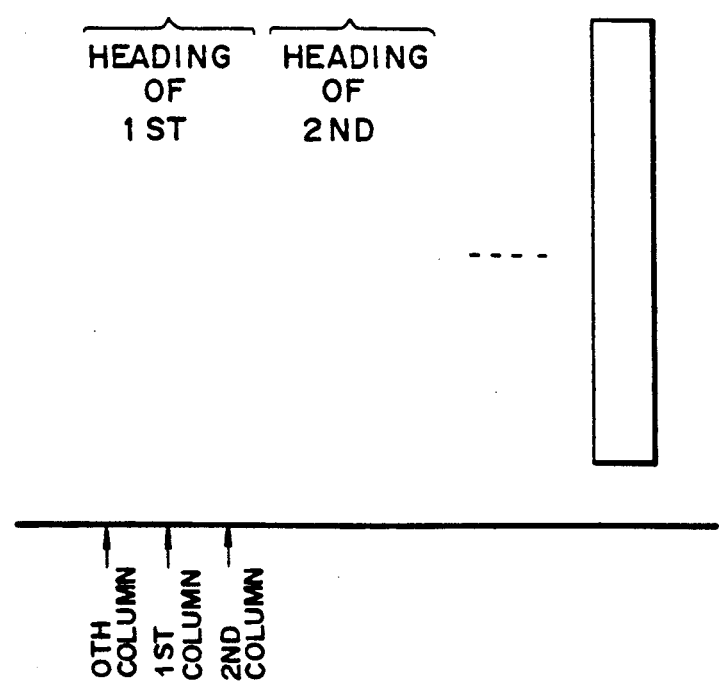

DIGITAL COPIER APPARATUS WITH EXTERNAL LASER CARD STORAGE MEDIUM AND IMAGE COMPRESSION VARIABLE WITH AVAILABLE MEMORY

BACKGROUND OF THE INVENTION

The present invention relates to a digital copier to which an external storing device of the kind using a laser card and other storing media may be affixed.

In a prior art analog copier, image light produced by scanning an original document is directly focused on a photoconductive element by an optical arrangement. Such a copier, therefore, is incapable of storing image data as provided by scanning the document in a certain place, not to speak of protecting the image data for secrecy.

When it comes to a digital copier having a capability of converting image data as provided by scanning an original document into an electrical signal, the electric signal can be stored if use is made of a suitable storing medium. With a digital copier, it has been customary to store graphic data and character data together in a single storing medium by transforming characters into bit images through character codes in the same manner as pictures. In this manner, when pictures and characters are recorded and reproduced mixed with each other, it is a common practice to convert character data into bit images in the same manner as graphic data so that they may be recorded and reproduced together with graphic data. A problem with such a recording and reproducing system is that since the amount of data to accommodated is large, an optical disk and other expensive mass storages have to be used in place of an inexpensive floppy disk and others whose capacity is relatively small (1 to 2 megabits). For example, to store data printed on an original document of format of A3 at 400 dpi inch, a capacity of 32 megabits is needed. While graphic and character data may be stored after being compressed as already proposed, a sufficient degree of compression has not been achieved yet.

On the other hand, when the memory area left unoccupied in an IC (integrated circuit) card, magnetic card, optical file or like storing medium becomes scanty, it is usually replaced with another wasting the remaining memory area. This is undesirable from the viewpoint of effective use of a storing medium.

Further, in a recording medium of the kind described, it is a common practice to assign memory addresses to part of the memory area so as to record the remaining amount of capacity. However, the remaining amount of capacity cannot be seen without resorting to an exclusive reading device, i.e., the storing medium cannot display the remaining capacity for itself.

In an optical disk system and others having a capacity great enough to accommodate a considerable amount of data, an arrangement is made such that image data read are stored with headings added thereto on a page-by-page basis for the purpose of facilitating searches which may be desired in the future. This brings about another drawback that, for example, image data continuously read from a series of documents which are fed by a document feeder cannot be sequentially outputted unless one enters a particular output order on an operation board by troublesome manipulation.

SUMMARY OF THE INVENTION

It is, therefore, an object of the present invention to provide a digital copier having an external storing device of the type using an inexpensive storing medium.

It is another object of the present invention to provide a digital copier having an external storing device of the type using a laser card (optical card).

It is another object of the present invention to provide a digital copier using a laser card a part of which can be visualized and an external storing device which causes the visible part of the laser card to display a remaining amount of capacity to allow a person to see it by intuition.

It is another object of the present invention to provide a digital copier having an external storing device which, when the remaining capacity of a storing medium is smaller than the amount of a particular number of pages of image data which are to be written in the storing medium, applies reduction processing which matches with the remaining capacity to the image data to thereby prevent a series of image data from being recorded in pieces in more than one recording medium.

It is another object of the present invention to provide a digital copier having an external storing device which stores character codes representative of character data and bit data representative of graphic data in a single storing medium in distinction from each other, so that the image data and the character data are eventually outputted in combination with each other by way of individual means.

It is another object of the present invention to provide a digital coper having an external storing device which omits complicated manual operations by recording image data and extra data necessary for printing them out at the same time in a storing medium.

It is another object of the present invention to provide a digital copier having an external storing device which protects image data for secrecy.

It is another object of the present invention to provide a digital copier which automatically puts the pages of copies in order.

It is another object of the present invention to provide a digital copier having an external storing device which stores an operation manual, service manual and others in a recording medium.

A digital copier using an external storing medium for storing a document image of an original document of the present invention comprises inputting means for converting into an electric signal image data which are read by scanning the document image, recording means for recording image data, which have been converted into the electric signal by the inputting means, by storing the image data in the storing medium, and outputting means for printing out the electric signal to reproduce an image.

BRIEF DESCRIPTION OF THE DRAWINGS

The above and other object, features and advantages of the present invention will become more apparent from the following detailed description taken with the accompanying drawings in which:

FIGS. 15A and 15B are views showing a laser card in which one block of each row defines a memory residual display area;

FIGS. 43A to 43D are schematic diagrams each showing a particular document feed order and an orientation of documents in an ADF;

FIGS. 44, 45, 46 and 47 each showing an exemplary manner of writing data in a laser card;

DESCRIPTION OF THE PREFERRED EMBODIMENTS

Figure 1:
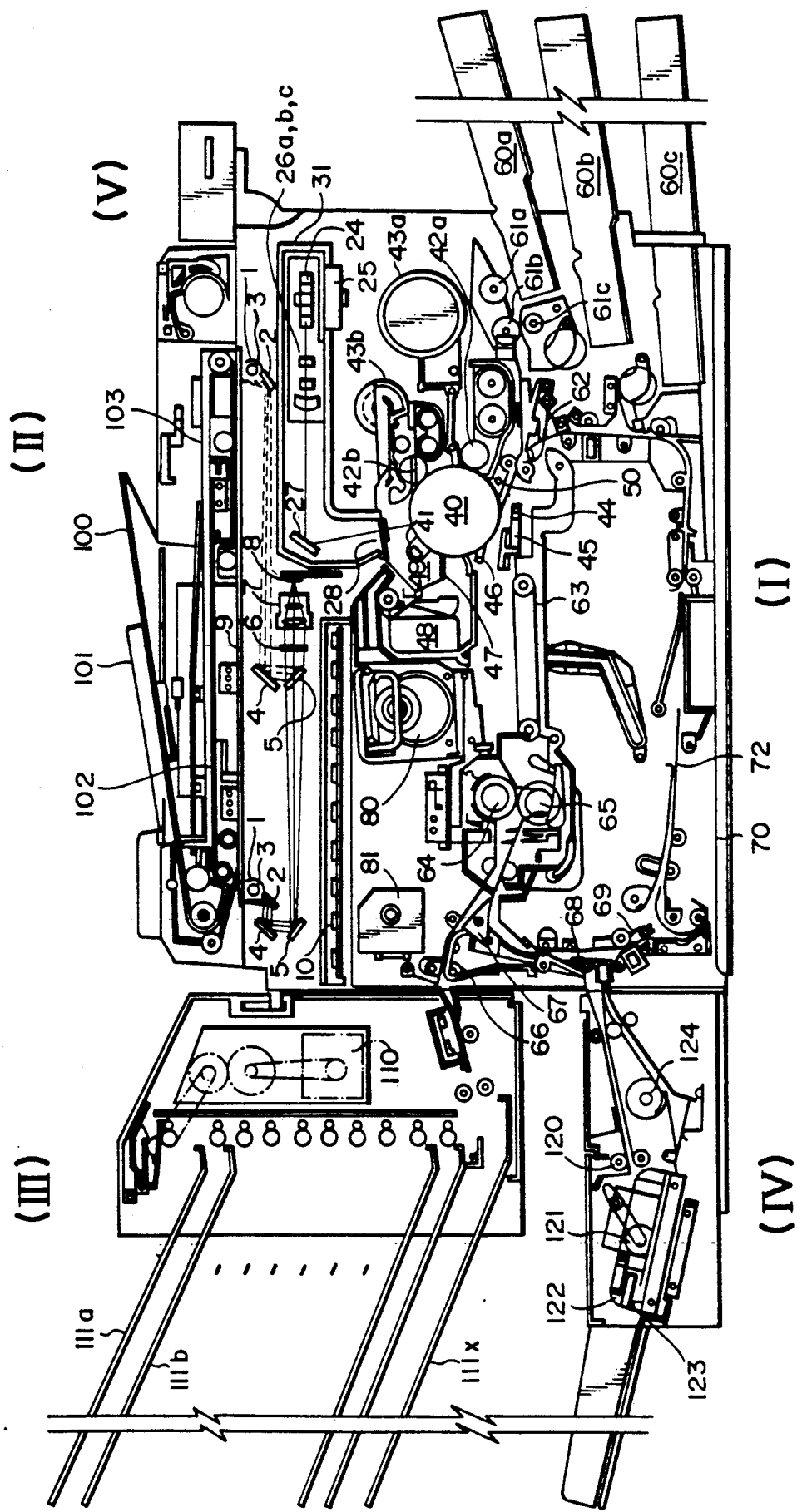
FIG. 1 is a view of the overall construction of a digital copier in accordance with the present invention.

Referring to to FIG. 1 of the drawings, a digital copier embodying the present invention is shown. As shown, the copier is generally made up of a copier body (I), an automatic document feeder (ADF) (II), a sorter (III), a two-side inversion unit (IV), and a memory card reader/writer (V). Various sections which constitute the copier of FIG. 1 will be described in sequence.

[Scanner Section]

A first scanner is movable at a predetermined speed with a reflector 1, a lamp 3 and a first mirror 2 mounted theron, and a second scanner is movable along with and at half the speed of the first scanner with mirrors 4 and 5 mounted thereon. The reflector 1 and lamp 3 constitute an illuminating device. An original document laid on a glass platen 9 is scanned by the first and second scanners. Image light reflected by the document is focused on a one-dimensional solid state image sensor 8 by a lens 7. While the lamp 3 of the first scanner may be implemented with a flourescent lamp, halogen lamp and others, use is commonly made of a fluorescent lamp which has stable wavelength and long service life. Although only one lamp 3 is shown in the drawing, two or more lamps may be used as desired. Since the image sensor 8 has constant sampling clock, a fluorescent lamp has to be turned on at a higher frequency than the sampling clock in order to eliminate adverse influence on an image.

Usually, the image sensor 8 is implemented with a CCD (charge coupled device) image sensor. An image signal read by the image sensor 8 which is an analog signal is converted into a digital signal and, then, subjected to various kinds of image processing (binarization, tone processing, magnification change, edition, etc.) at an image processing board 10 to become a digital signal in the form of congregation of spots. In the illustrative embodiment, color image data may be produced by moving a filter into and out of an optical path which terminates at the image sensor 8. An original document is scanned timed to the movement of the filter 6. A multiplex transfer function, two-side function and others of a printer may be selectively effected to produce various kinds of copies as desired.

[Writing Section]

The image data undergone image processing are written on a photoconductive drum 40 at an optical writing section and in the form of congregation of light spots, the writing section using a laser beam and the principle of raster scanning. While use may be made of a He-Ne laser having a wavelength of 633 millimeters which well matches with a photoconductive element of a prior art copier, it is very expensive and cannot be modulated without resorting to the intermediary of a complicated arrangement. In this embodiment, a semiconductor laser which can be directly modulated is used. The writing section is shown in a plan view in FIG. 2.

Figure 2:
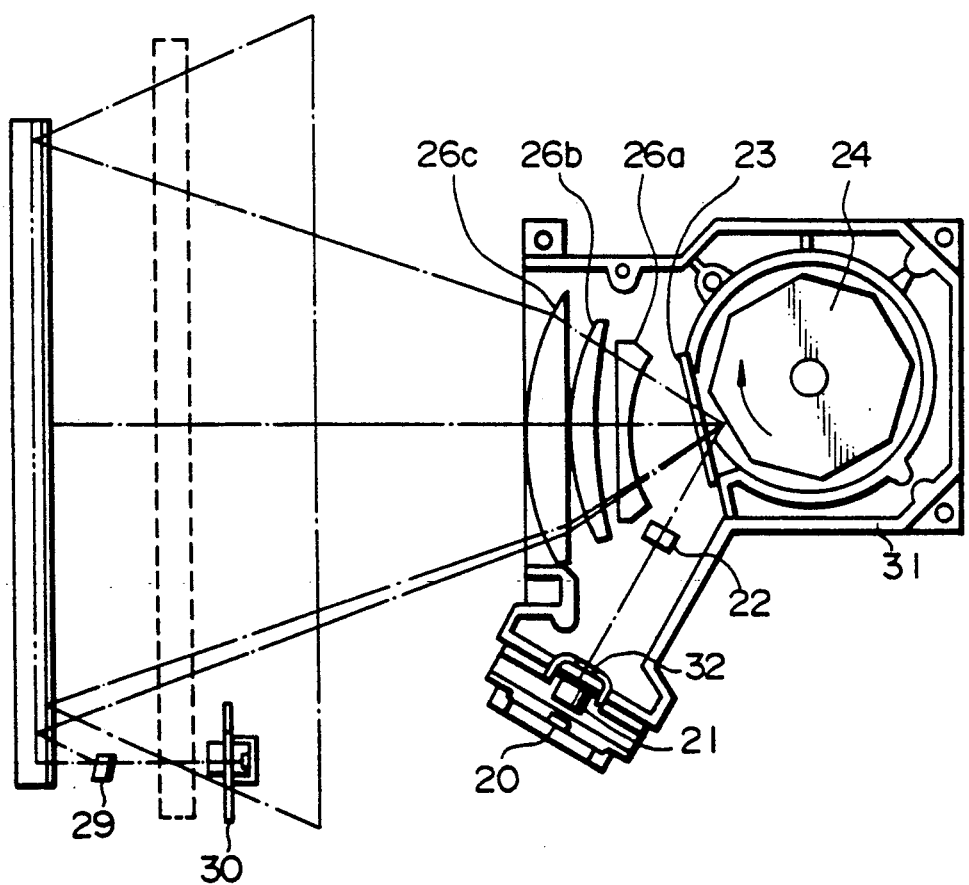
FIG. 2 is a plan view of a writing section of the digital copier.

In FIG. 2, light issuing from a semiconductor laser 20 is collimated into parallel rays by a collimating lens 21 and, then, shaped by an aperture 32 to become a beam having a predetermined shape. This beam is compressed in the subscanning direction by a first cylindrical lens 22 and, then, directed toward a polygon mirror 24 through a sound-insulating glass 23. Having an accurate polygonal cross-section, the polygon mirror 24 is rotated by a polygon motor, FIG. 1, at a predetermined speed in a predetermined direction. The rotation speed of the mirror 24 is determined on the basis of the rotation speed and writing density of the drum 40. The laser beam incident to the polygon mirror 24 is deflected by the mirror 24 toward f-theta lenses 26a, 26b and 26c through the sound-insultating glass 23. Functions assigned to the f-theta lenses 26a to 26c are scanning the drum 40 at a constant rate by the laser beam whose angular velocity is constant, focusing the light beam on the drum 40 such that the beam forms a minimum light spot, and compensating for tilting. In a position outside of an image area, the laser beam coming out from the f-theta lenses 26a to 26c is reflected by a mirror 29 to reach a synchronization sensor 30. After the synchronization sensor 30 has produced a synchronization signal for a head signal which is associated with the main scanning direction, one line of image data are delivered upon the lapse of a predetermined period of time. This procedure is repeated thereafter to complete one full image.

[Photoconductive Drum Section]

The photoconductive drum 40 has a photoconductive layer on its outermost periphery. In this embodiment, the photoconductive layer is implemented with an organic photoconductive (OPC) which is sensitive to the wavelength of 780 millimeters of a semiconductor laser, e.g. α-Si and Se-Te. As regards laser writing, while an N/P process for illuminating an image area and a P/P process for illuminating a background area are available, this embodiment uses the N/P process. A charger 41 is provided with a grid adjacent to the drum 40 and uniformly charges the surface of the drum 40 to the negative polarity. The laser beam illuminates an image area of the drum surface to lower its potential. As a result, a latent image is electrostatically formed in which the potential is about −750 volts to about −800 volts in a background area and about −50 volts in an image area. In a developing unit 42a or 42b, a bias voltage ranging from −500 volts to −600 volts is applied to a developing roller so that negatively charged toner is deposited on the latent image to develop the latter.

While the illustrative embodiment includes two developing units as stated above, for black/white image reproduction the developing unit 42b which is an auxiliary unit and its associated toner supply unit 43b may be omitted. A toner supply unit 43a associated with the developing unit, or main developing unit, 42a stores black toner, and the toner supply unit 43b associated with the auxiliary developing unit 42b stores color toner. The developing units 42a and 42b are selectively conditioned for development by, for example, changing the position of a main pole of one developing unit while the other developing unit is operated. This kind of development may be combined with the operation of the filter 6 and a multiplex transfer function and a two-side copy function of a paper transport system in order to produce various kinds of color copies while editing color image data. Development in three or more colors may be implemented by three or more developing units which are fixely arranged around the drum 40 or angularly movable to selectively reach a developing station.

The toner image produced by the developing units 42a and 42b is charged by a transfer charger 44 from behind to the positive polarity and, thereby, transferred to a paper which is fed in synchronism with the rotation of the drum 40. The paper with the toner image is subjected to AC discharge by a separation charger 44 which is held integrally with the transfer charger 44, whereby it is removed from the drum 40. The toner remaining on the drum 40 without being transferred to the paper is scraped off from the drum 40 by a cleaning blade 47 and, then, collected in a tank 48. Further, the potential pattern remaining on the drum 40 is erased by a discharging lamp 49. A photosensor 50 is located immediately after the developing station. Constituted by a light-emitting element and a light-sensitive element, the photosensor 50 is adapted to measure the image density in terms of a ratio between reflectivity of a pattern portion and that of the other portion which are defined on the drum 40 by writing a predetermined pattern (black pattern or dot pattern) in a position corresponding to the photosensor 50 and developing it. When the image density measured is low, the photosensor 50 produces a toner supply signal. That the density does not increase even after the supply of toner may show that the remaining amount of toner is short.

[Sheet Feed Section]

In this embodiment, a sheet feed section includes a plurality of cassettes 60a, 60b and 60c. A paper with a toner image may be routed through a re-feed loop 72 for producing a two-sided copy or for feeding it again. When any of the cassettes 60a to 60c is selected and, then, a start button is depressed, a feed roll 61a, 61b or 61c associated with the cassette are rotated to feed a paper until the paper abuts against a register roller 62 which is in a halt then. Timed to an image position on the drum 40, the register roller 62 begins to rotate to drive the paper to the drum 40 so that a toner image is transferred from the drum 40 to the paper. A separation and transport section 63 separates the paper from the drum 40 and transports it to a fixing roller which is constituted by a heat roller 64 and a presser roller 65, the fixing roller fixing the toner image on the paper.

In a usual copy mode, the paper with the toner image fixed thereon is directed by a selector pawl 67 toward an outlet which adjoins the sorter (III). In a multiplex copy mode, the paper is guided by the selector pawl 67 downward and, without being redirected by other selector pawls 68 and 69, routed through the loop 72 to reach the register roller 62 again. As regards a two-side copy mode, it may be selectively effected by the copier body (I) only or by the copier body (I) and the two-side inversion unit (IV). When only the copier body (I) is used, the paper directed downward by the selector pawl 67 is fed further downward by the pawl 68 and, then, guided by the pawl 69 toward a tray 70 which is located below the loop 72. Then, a roller 71 is actuated to return the paper toward the selector pawl 69 which, at this time, is oriented to guide the paper into the loop 72, so that the paper reaches the register roller 62.

[ADF]

The ADF (II) serves to automatically feed original documents one by one onto the glass platen 9 and, then, discharge them after they have been scanned. Specifically, documents stacked on a feed table 100 are positioned in the widthwise direction by using a side guide 101. A feed roll 104 feeds one document at a time from the stack on the feed table 100 and, then, a belt 102 transports the document to a predetermined position on the glass platen 9. After a desired number of copies have been produced, the belt 102 is actuated again to discharge the document to a tray 103. The size of the document may be detected by sensing the position of the side guide 101 selected and counting the feed time.

[Sorter]

The sorter (I) is usable to distribute copies coming out of the copier body (I) to bins 111a to 111x in a manner well known in the art. By a plurality of rollers which are rotated by a motor 110, the copies are distributed to selected ones of the bins 111a to 111x depending upon the positions of pawls which are individually located in the vicinity of the bins.

[Two-Side Inversion Unit]

The two-side inversion unit (IV) helps the copier body (I) produce multiple two-sided copies collectively. Specifically, papers fed downward by the discharge roller 66 is guided by the pawl 67 into the two-side inversion unit (IV). In the unit (IV), the papers are sequentially stacked on a tray 123 by a discharge roller 120 while being positioned by a feed roller 121 and a side guide 122. The papers on the tray 123 are sequentially fed out of the unit (IV) by a re-feed roller 124 when a timing for copying a document on their back is reached. At this instant, the papers are directly driven into the loop 72 by the pawl 69 and, therefrom, to the register roller 62.

[Electrical Control Section]

Figure 3A:
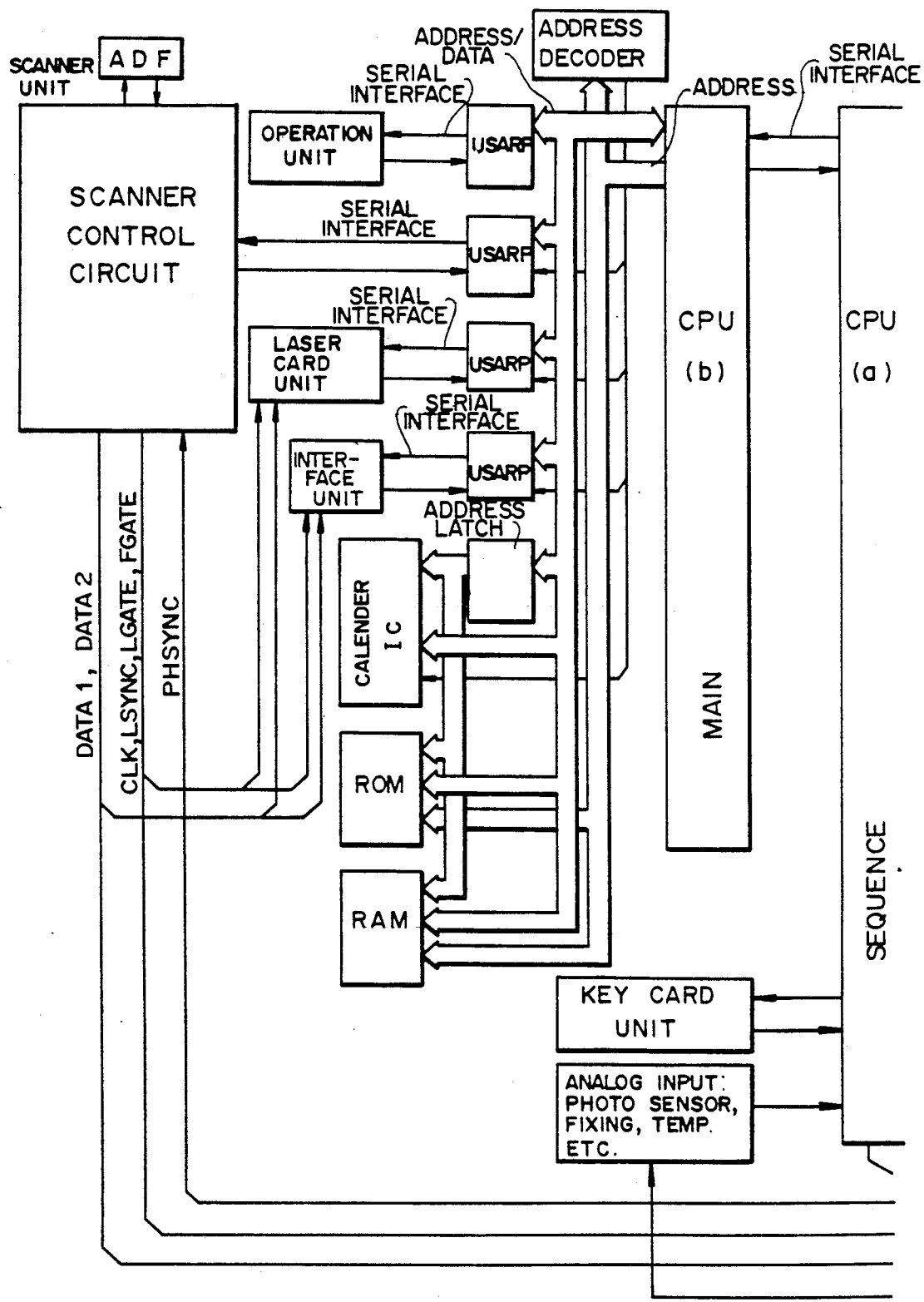
FIGS. 3A and 3B are block diagrams showing in combination an electrical arrangement of a printer section.
Figure 3B:
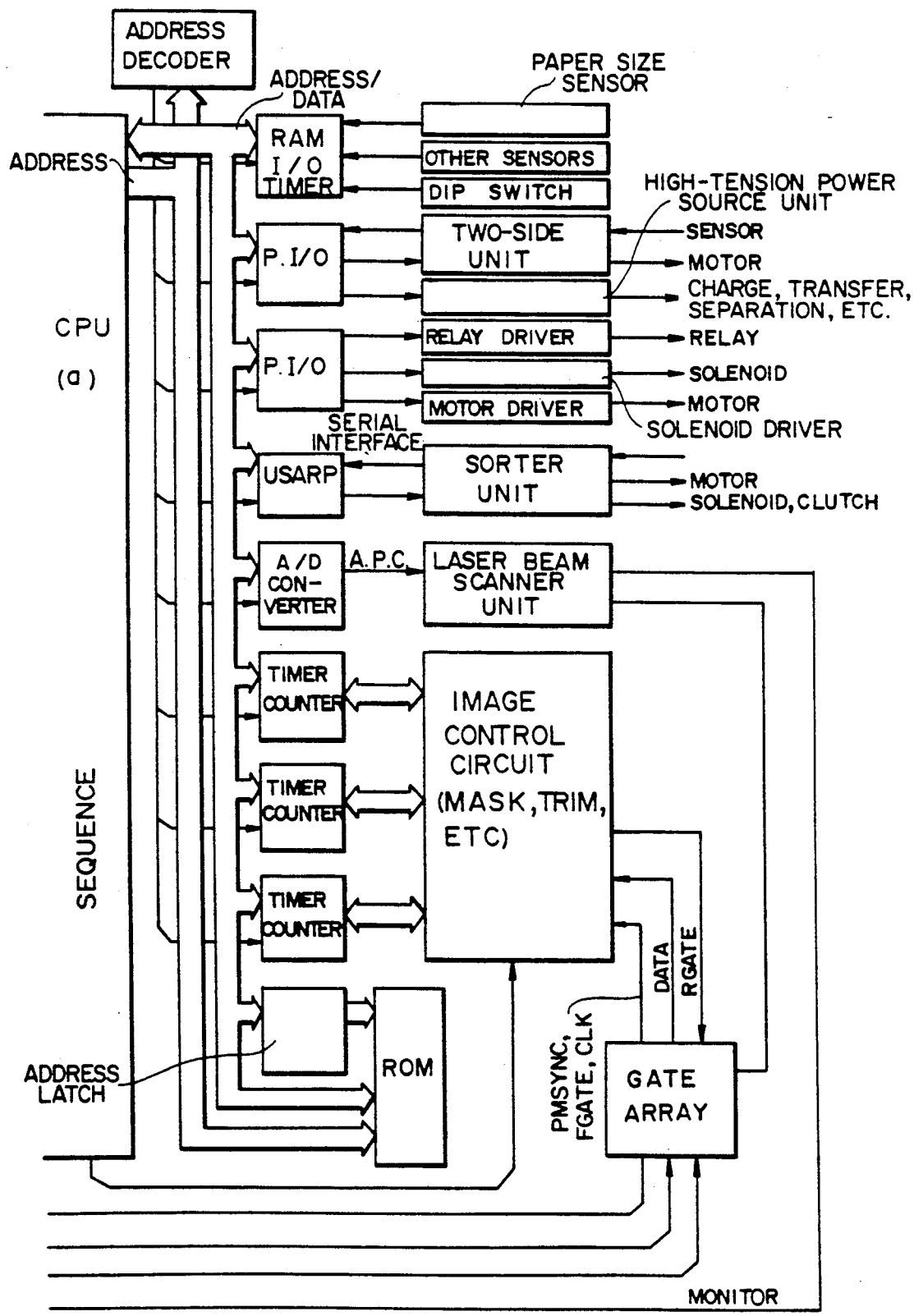

FIGS. 3A and 3B in combination show an electric circuit which is installed in a printer section of the copier. It is to be noted that a CPU (a) is shown in both of FIGS. 3A and 3B to show how the two figures should be combined. A control unit of the printer section includes two CPUs (a) and (b) which are assigned to sequence control and operation control, respectively. The CPUs (a) and (b) are interconnected by a serial interface (RS232C).

Sequence control which is associated with paper transport timings will be described first. Connected to the CPU (a) are a paper size sensor, sensors responsive to the discharge, register and others of a paper, the two-side inversion unit (IV), a high-tension power source unit, drivers associated with relays, solenoids, motors and others, the sorter unit (III), and the laser beam scanner unit. The paper size sensor produces an electric signal by sensing the size and orientation of papers which are loaded in its associated paper cassette. Also connected to the CPU (a) are an oil end sensor, a toner end sensor, a door open sensor, a fuse blow sensor, etc.

The two-side inversion unit (IV) is provided with a motor for regulating the widthwise position of papers, a paper feed clutch, a solenoid for switching a transport path, a solenoid for raising and lowering a roll which is adapted to shift a paper toward the leading end of the unit, a sensor responsive to presence/absence of papers, a home position sensor responsive to the position of a side fence, various sensors associated with paper transport, etc. The high-tension power source applies to each of the charger, transfer charger, separation charger and developing bias electrode a different predetermined high-tension power. The drivers are associated with a sheet feed clutch, register clutch, counter, motor, toner supply solenoid, power relay, fixing heater, etc. The CPU (a) is connected to the sorter unit (III) by the sreial interface so that papers may be transported at predetermined timings. Applied to an analog input of the CPU (a) are a fixing temperature, photosensor output, laser diode condition being monitored, and laser diode reference voltage. As regards the photosensor output, a photosensor pattern produced at a predetermined timing is outputted by a phototransistor so that the CPU (a), based on the density of that pattern, couples and uncouples the toner supply clutch to control the toner density. To maintain the output power of the laser diode, an analog-to-digital (AD) converter and the analog input of the CPU are used. Specifically, the control is such that the voltage monitored when the laser diode is turned on becomes equal to a predetermined reference voltage (which is so selected as to cause the laser diode output power to be 2 mW.

An image control circuit generates various timing signals associated with masking and trimming, erasure and photosensor pattern while delivering a video signal to the laser diode. A gate array functions to convert two-bit parallel image signals which are outputted by the scanner into a one-bit serial signal in synchronism with a synchronizing signal PMSYNC which is generated by the laser beam scanner unit and a signal RGATE representative of a write start position.

On the other hand, the CPU (b) assigned to operation control includes a plurality of serial ports and a calender IC. Connected to the serial ports are the CPU (a), scanner, laser card, interface unit, etc. An operation board includes various keys which may be operated by an operator, and various indicators associated with the conditions of the copier. While data keyed in one the operation board are serially sent to the CPU (b), the indicators are selectively turned on by serial outputs of the CPU (b). The CPU (b) interchanges data associated with image processing and image reading with the scanner, interchanges data which will be described with the laser card unit, and interchanges preset data with the interface unit. The calender IC stores date and time so that the copier may be turned on and off based on those data.

Figure 4:
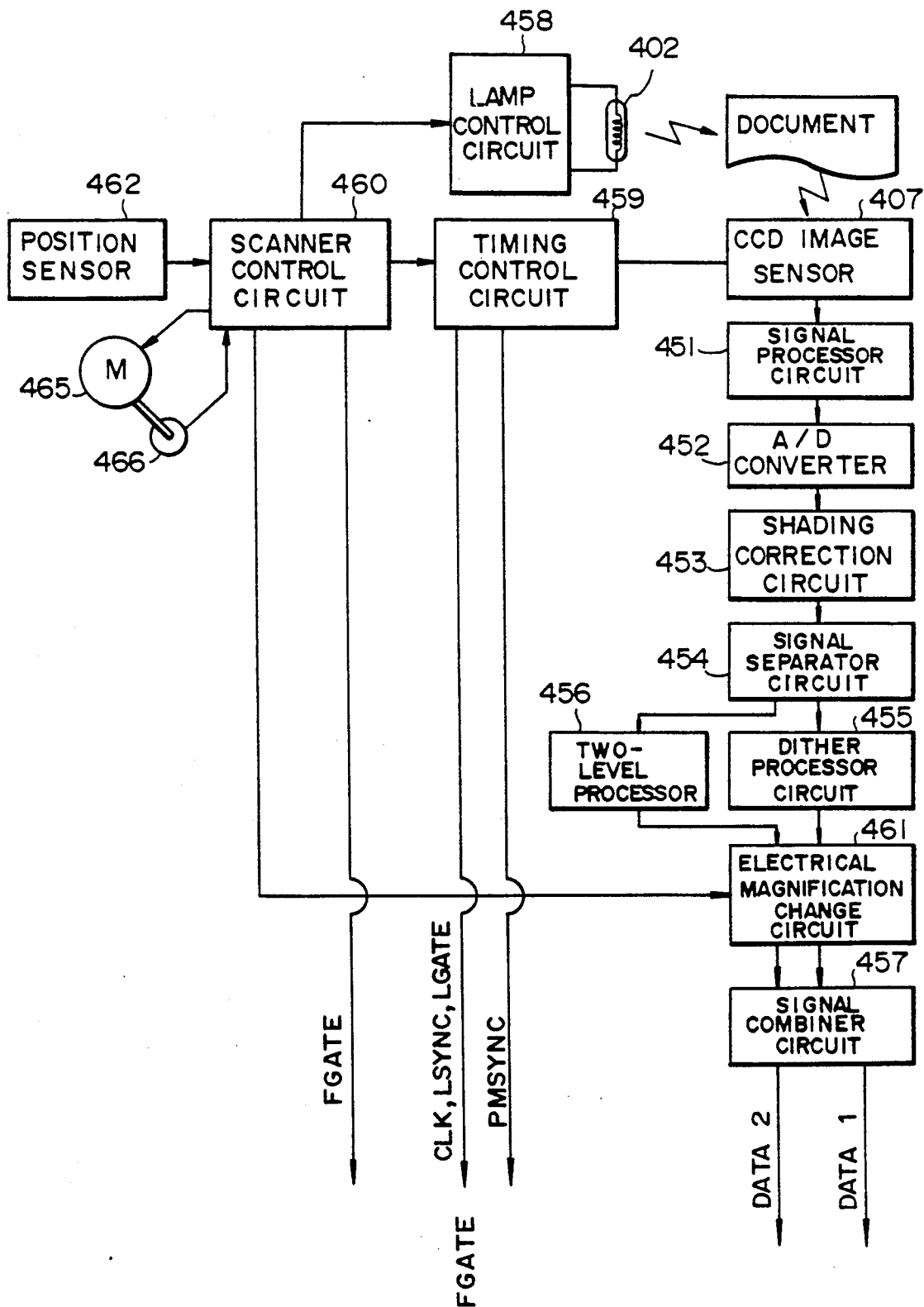
FIg. 4 is a block diagram showing an image scanner section.

FIG. 4 shows the electrical arrangement of the image scanner section. An electric signal, i.e., analog image signal produced by a CCD image sensor 407 is amplified by a signal processor circuit 451 and, then, converted by an AD converter 452 into a multi-level digital signal. This digital signal is routed to a signal separator circuit 454 through a shading correction circuit 453. Processing the input image data, the signal processor circuit 454 separates characters and other two-level image components and halftone image components. While the two-level image components are applied to a two-level processor circuit, or binarizer, 456, the halftone image components are fed to a dither processor circuit 455. Using a predetermined threshold value, the two-level processor circuit 456 converts the input multi-level data into two-level data. The dither processor circuit 455 discriminates the input data by using various threshold values which are predetermined on a scanning point basis, thereby producing two-level data including halftone data. A signal combiner circuit 457 combines the two-level signal output by the two-level processor circuit 456 and that output by the dither processor circuit 455 so as to produce signals DATA1 and DATA2.

A scanner control circuit 460 controls a lamp control circuit 458, a timing control circuit 459, an electrical magnification change circuit, and a scanner drive motor 465 in response to commands which are applied thereto from the printer control section. The lamp control circuit 458 turns on and off the lamp 402 and controls the quantity of light, as commanded by the scanner control circuit 460. A rotary encoder 466 is connected to the output shaft of the scanner drive motor 465, and a position sensor 462 senses a reference position of a subscanning drive mechanism. The electrical magnification change circuit 461 applies electrical magnification change processing to the image data undergone dither processing and the image data undergond two-level processing, on the basis of magnification data which is set by the sanner control circuit 460 and associated with main scanning.

The timing control circuit 459 produces various signals in response to a command from the scanner control circuit 460. Specifically, as reading begins, the timing control circuit 459 delivers to the CCD image sensor 407 a transfer signal for transferring one line of data to a shift register and shift clock pulses for delivering data from the shift register one bit at a time, while delivering to an image reproduction control unit pixel synchronizing clock pulses CLK, main scanning synchronizing pulses LSYNC, and main scanning valid period signal LGATE. The pixel synchronizing clock pulse CLK is substantially the same as the shift clock pulse which is applied to the CCD image sensor 407. While the main scanning synchronizing pulse LSYNC is substantially the same as a main scanning synchronizing signal PSYNC which the beam sensor of the image writing unit produces, it is inhibited from appearing when an image is not read. The main scanning valid period signal LGATE becomes high level, H, when the output data DATA1 and DATA2 are considered valid. In the illustrative embodiment, the CCD image sensor 407 produces 4,800 bits of valid data per line. The data DATA1 are associated with odd pixels, and the data DATA2 with even pixels.

The scanner control circuit 460 responds to a read start command from the printer control section by turning on the lamp 402, driving the scanner drive motor 465, and controlling the timing control circuit 459 to thereby cause the CCD image sensor 407 to start reading an image. Simultaneously, the scanner control circuit 460 sets the subscanning valid period signal FGATE to high level. This signal FGATE becomes low level, L, as a period of time necessary for scanning a maximum reading length (lengthwise dimension of a paper of format A3 in the illustrative embodiment) expires after the signal GATE has been set to high level.

[Store Section]

A store section is accessible for writing image data which are read by the scanner and reading them out to cause the printer section to print them out. Various kinds of image data storing media are applicable to the store section, e.g. an optical disk, hard disk, floppy disk, laser card, IC card, magnetic tape, and magnetic card. Generally, digital image data require an extremely large storage capacity. For example, to store format A3 at 400 dpi × 400 dpi as two-level data, the capacity needed amounts to 300 megabits per paper. For this reason and because rapid response is required, most of ordinary storing media are impractical. From the capacity standpoint, optical disks and hard disks are useful. In the illustrative embodiment, a laser card (optical card) is adopted because it is convenient to use.

Figure 5:
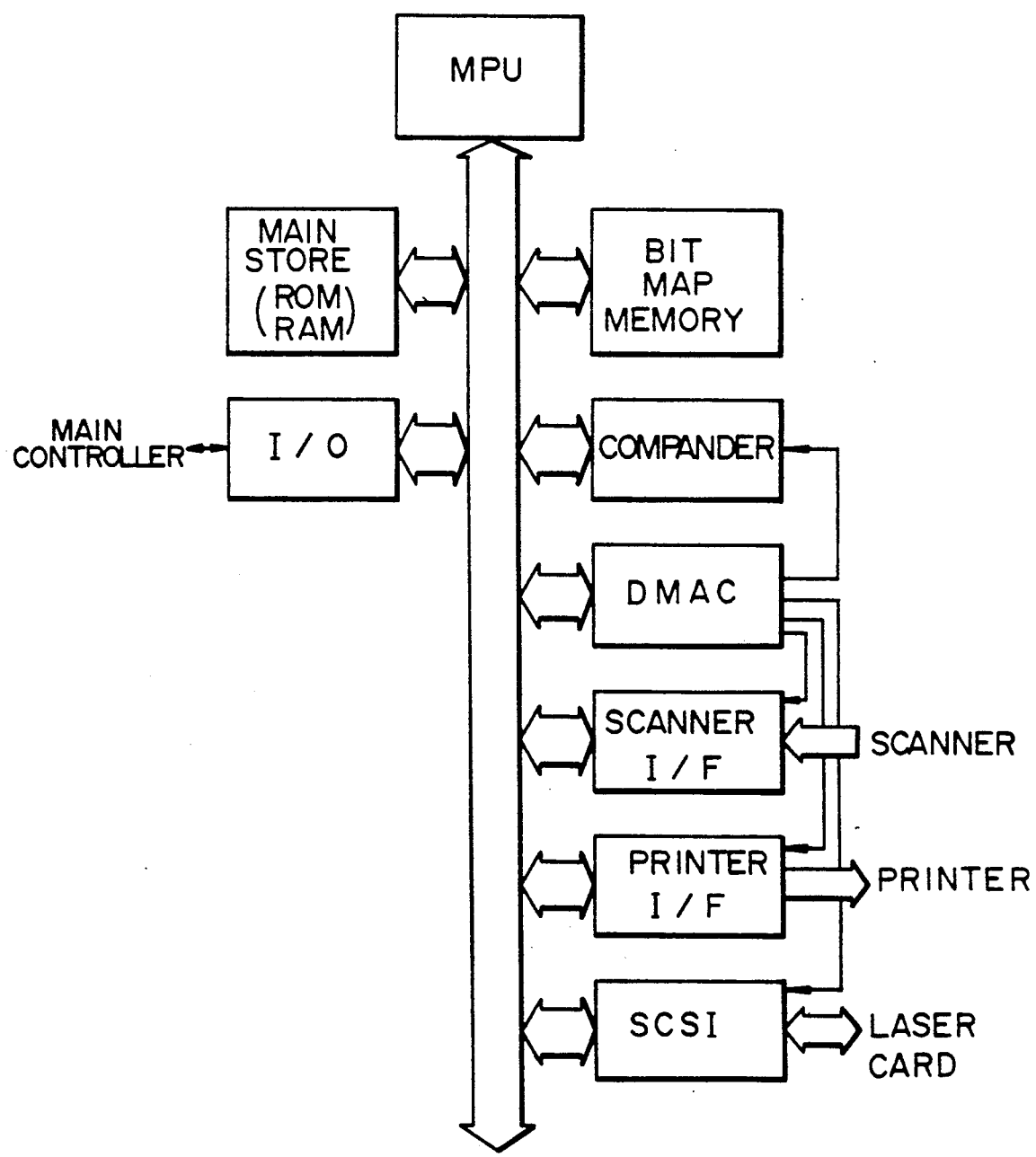
FIGS 5 and 6 are block diagrams showing in combination an electrical arrangement of a laser card control unit.

As shown in FIG. 5, a laser card control unit by itself has an intelligent construction. In response to a command from a main controller, the laser card control unit makes access to a laser card device to write, read, modify and search data. Having a common construction, the laser card control unit of FIG. 5 is made up of a bit map memory for temporarily storing image data through image data interfaces which are individually associated with the scanner and the printer, a compander for applying run-length compression to the image data stored and delivering the compressed image data to the laser card device via a small computer system interface (SCSI), and a microprocessor section made up of an MPU, main store, direct memory access controller (DMAC), and input/output (I/O) unit for interchanging commands and statuses with the main controller. The microprocessor section controls the overall laser card control unit.

Figure 6:
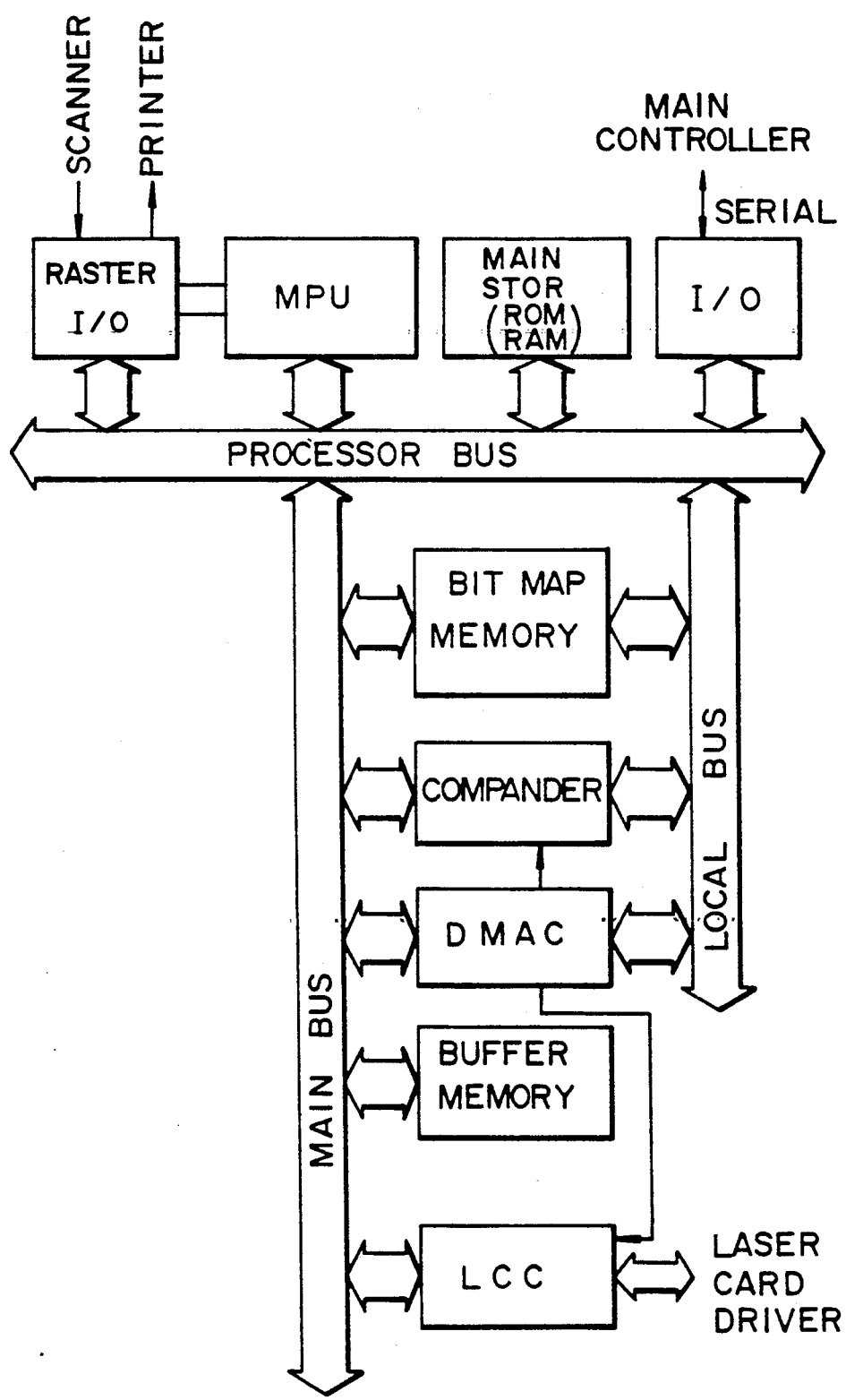

Although the arrangement shown in FIG. 5 is common, since all the signals (control codes and image data) are interchanged over a single bus, the bus has to bear a substantial load and, therefore, it is not easy to transfer a large amount of data. To compensate for such a disadvantage, the laser card control unit may be provided with an exclusive local bus for image data and the interface with the scanner and printer may be simplified, as shown in FIG. 6. Specifically, the control unit shown in FIG. 6 includes a processor bus to which the MPU, I/O unit and a main store are connected, a main bus to which the compander, DMAC, buffer memory and laser card controller (LCC) are connected, and a local bus for delivering image data via the DMAC.

Image data from the scanner are written in the bit map memory based on the access addresses of the MPU. To write image data read out of the bit map memory in a laser card, the image data are transferred from the bit map memory to the buffer memory by way of the local bus, compander and main bus, whereby they are stored in the buffer memory compressed to $\frac{1}{4}$ to 1/20. Such a flow of image data is controlled by the DMAC as instructed by the MPU and caused rapidly by making most of the main bus and local bus. The image data stored in the buffer memory are handed over to the LCC by the DMAC or the MPU, and the LCC writes them in the laser card. Conversely, to read image data out of the laser card, the MPU indicates the LCC a track to read and causes the DMAC to load the buffer memory with image data, which are read by the LCC, via the main bus. Thereafter, the MPU actuates the DMAC again in order to expand and develop the image data stored in the buffer memory in the bit map memory by way of the main bus and compander.

Figure 7:
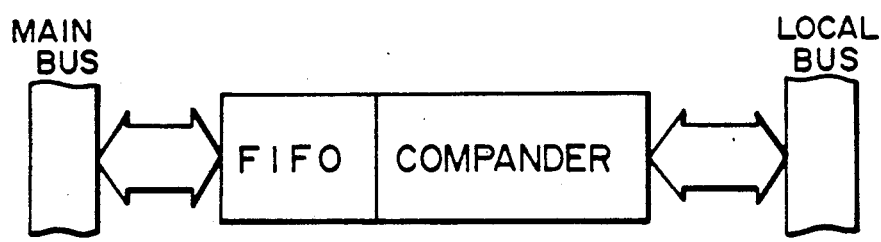
FIG. 7 is a block diagram showing the connection between a compander and a first-input-first-output (FIFO) memory.

To further speed up the transfer of image data to the LCC, as shown in FIG. 7, a first-in-first-out (FIFO) memory may be connected to the compnader to allow image data to be continuously fed to the LCC. In this case, the buffer memory is omissible.

Figure 8:
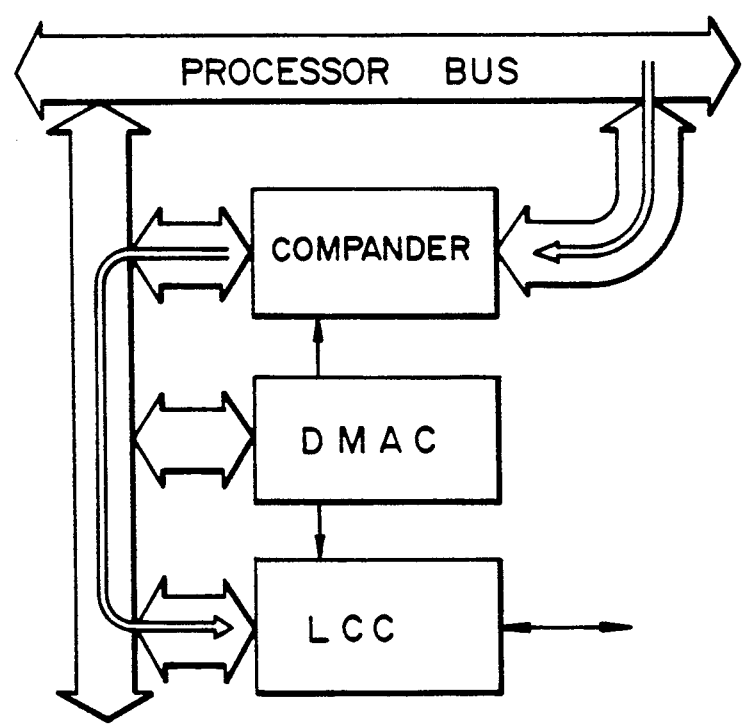
FIG. 8 is a schematic block diagram showing the flow of data which are fed from the scanner.

In the case that the delivery of data from the scanner and that to the printer are slower, the data from the scanner, for example, may be directly routed to the LCC via the compander by using the processor bus, as shown in FIG. 8. This eliminates the need for the bit map memory.

Figure 9:
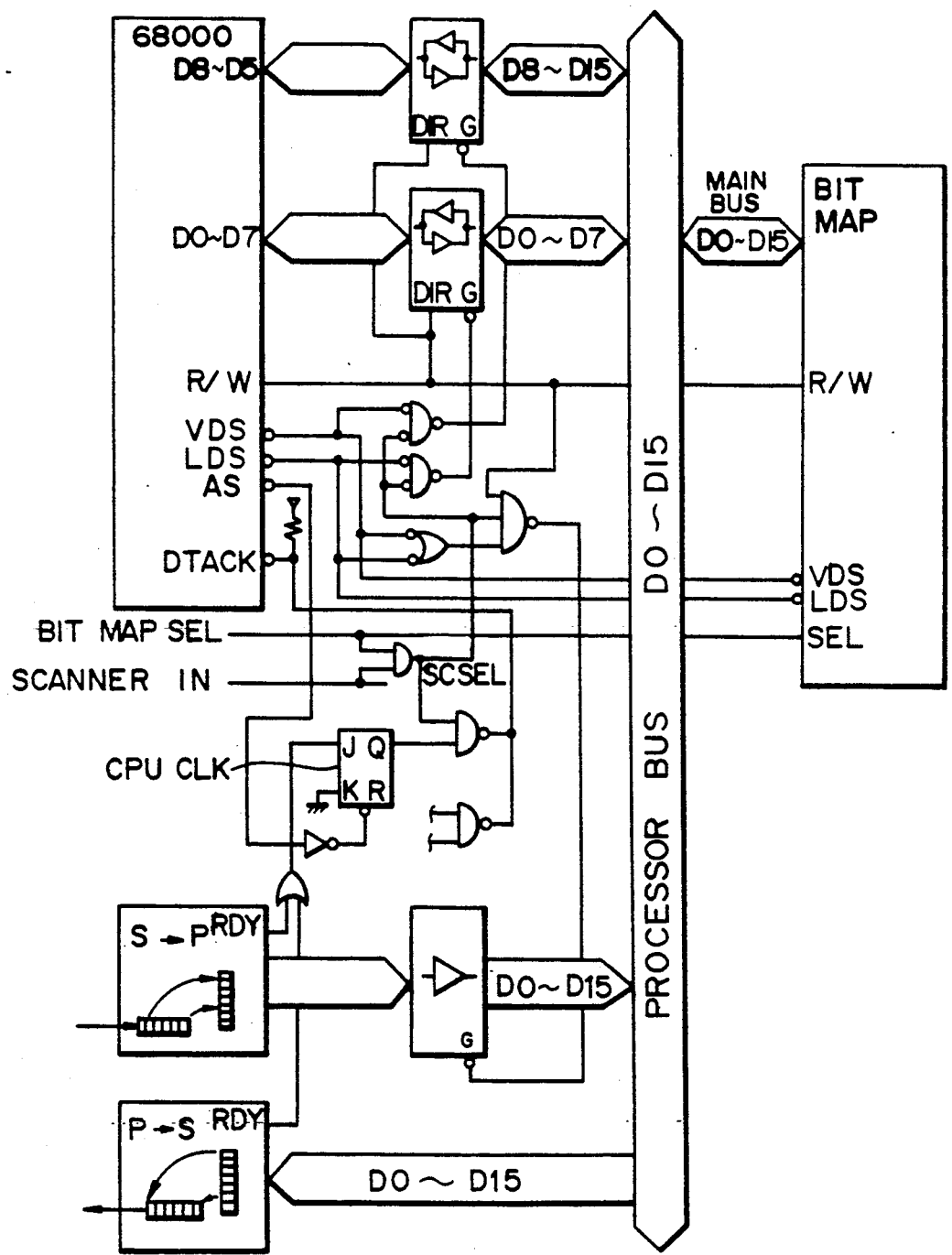
FIG. 9 is a schematic block diagram of a raster input-/output (I/O) unit.

A specific construction of the raster I/O which is connected to the scanner and printer is shown in FIG. 9. Basically, the raster I/O of FIG. 9 is mainly constituted by a circuit for converting serial data which are applied thereto from the scanner in synchronism with a scanning synchronizing signal into parallel data, and converting the parallel data which are to be fed to the printer into serial data. Customarily, a DMAC accesses a bit map memory in response to a scanning synchronizing signal, or an MPU transfers data between bit map memories by a program I/O system. In contrast, the raster I/O of FIG. 9 is constructed such that the MPU generates addresses in synchronism with the scanning synchronizing signal and image signal to thereby transfer data. Utilizing the fact that the address bus is asynchronous, the MPU controls data acknowledge (DTACK) for the synchronization with image data.

Figure 10:
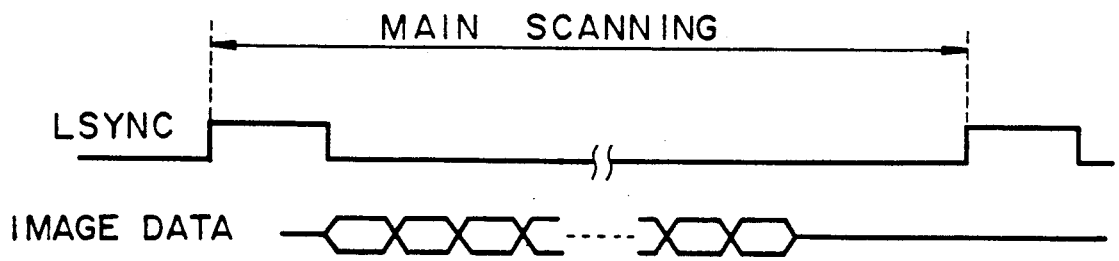
FIG. 10 is a timing chart demonstrating how data are inputted.
Figure 11:
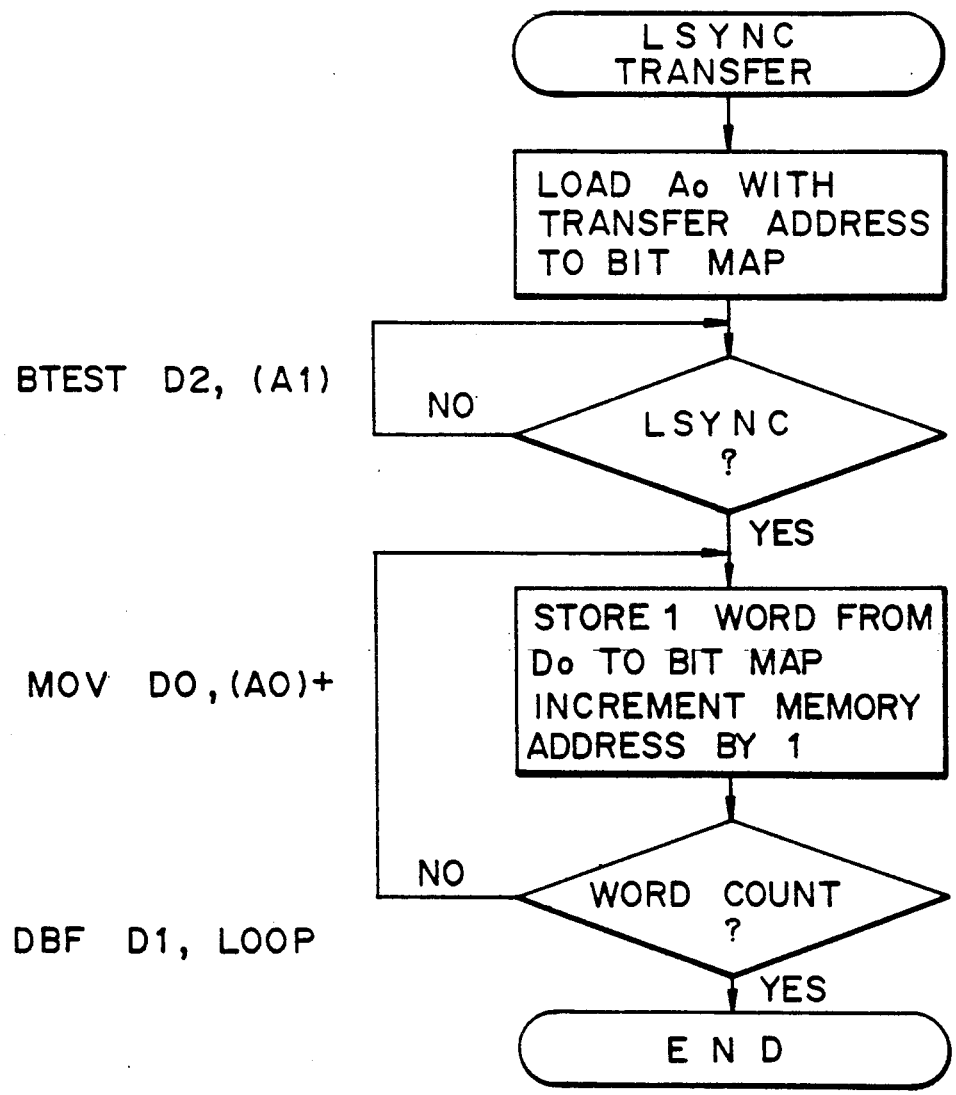
FIG. 11 is a flowchart representative of a transfer routine.

How data from the scanner are transferred to the bit map memory will be described by way of example. As shown in FIG. 10, image data are inputted in synchronism with the main scanning synchronizing signal LSYNC. FIG. 11 shows a transfer routine. As shown in the figure, the MPU checks the signal LSYNC first, by a polling procedure. In response to the signal LSYNC, the MPU immediately starts on an operation for writing the content of an address register D0 in the addresses of the bit map memory which are designated by a register A0. At this instant, the MPU has already set SCANNER IN to (logical) ONE because what occurs is the transfer of data from the scanner to the bit map memory. Also, since the addresses generated by the MPU designate the bit map memory area, address decode signal bit map memory SEL (bit MAP SEL) has naturally be set to ONE. In this condition, SC SEL becomes ONE so that the data bus of the MPU is disconnected from the processor bus and, instead, serial-to-parallel (SP) converted data are loaded on the processor bus. Simultaneously, JKFF adapted to generate data acknowledge waits for a signal RDY which is representative of full line-up of the SP converted data. Specifically, JKFF does not return DTACK until the SP converted data on the processor bus become valid, maintaining the MPU in a WAIT condition. In response to the signal RDY, JKFF returns DTACK to the MPU so that the MPU delivers a UDS and an LDS strobe signal to the bit map memory. Consequently, the data on the processor bus are written in predetermined addresses of the bit map memory. Thereafter, the register A0 is incremented to begin the next write cycle. In this manner, the MPU generates addresses timed to scanner data so as to write them in the bit map memory. This allows the MPU to transfer data rapidly without fetching data to its own register. Data flows from the bit map memory to the printer in the same manner as described above, except that the direction is reversed.

Figure 12:
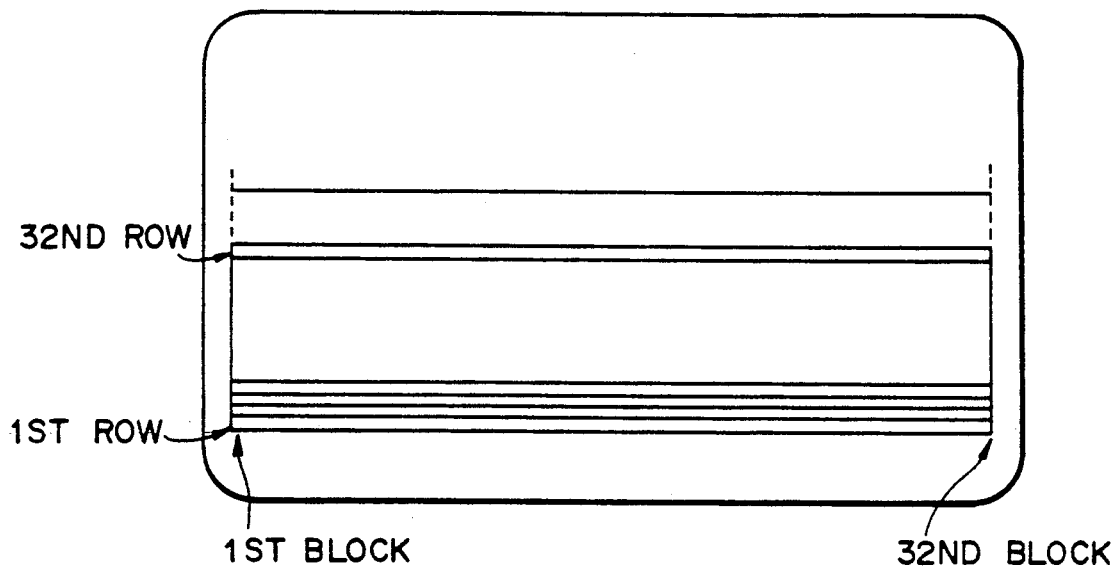
FIG. 12 is a view showing an exemplary format of a laser card.
Figure 13:
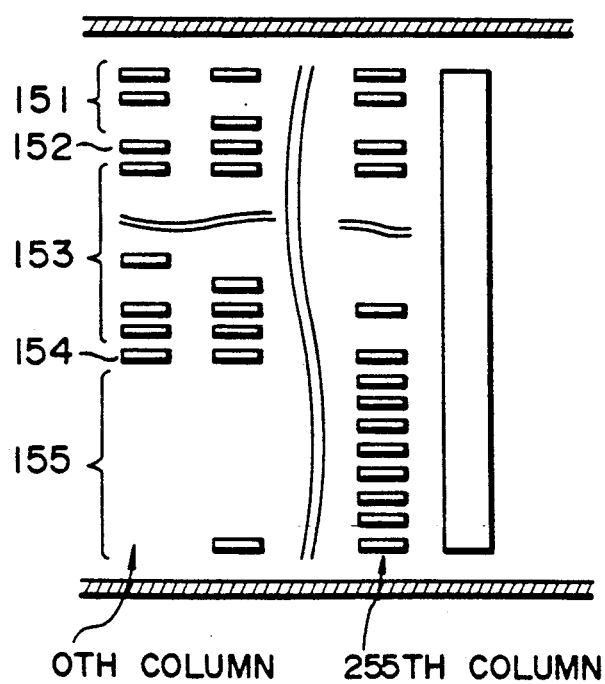
FIG. 13 is a schematic view showing one block of the laser card in detail.

Referring to FIG. 12, an exemplary format of a laser card is shown. Here, the laser card is assumed to accommodate one megabyte of data. The entire storing portion of the laser card is dimensioned 82.24 millimeters $\times$ 15.872 millimeters and made up of thirty-two rows each of which is segmented into thirty-two blocks. One of the thirty-two blocks is shown in an enlarged scale in FIG. 13. As shown in FIG. 13, one block is segmented into 256 columns and isolated from its nearby blocks by extra rows. One column is made up of eight address bits 155 capable of designating 256 addresses, a start bit indicative of the beginning of data, thirty-two data bits 153, three error check bits 151 (parity error, over error, framing error, etc), and a stop bit 152. Since one block has 8192 bits (1 kilobyte), i.e., $32 \times 256 = 8192$, one row has 32 kilobytes. Hence, the total number of bits available is 1024 kilobytes (1 megabyte), i.e., $32 \times 32 = 1024$.

Hereinafter will be described some embodiments of the present invention which allow one to see how much of the capacity of a laser card is left and available for further storage by use of a laser beam.

Figure 14:
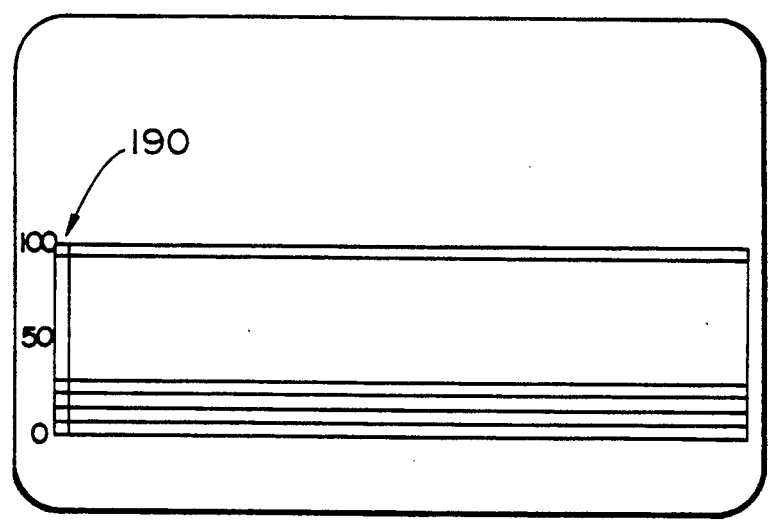
FIG. 14 is a view of a laser card in which a memory residual display zone is defined in a part of a memory;area
Figure 15A:
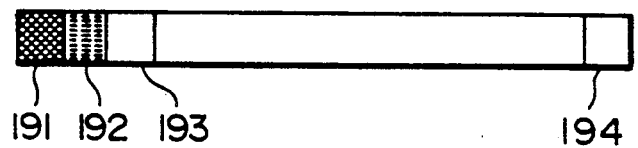

In FIG. 14, a part of the memory area of the laser card, i.e., the first block of each row is used to constitute a display zone 190. For example, as shown in FIG. 15A, data are sequentially written in the second block 192 to the thirty-second block 194 of the first row with the first block of the same row irradiated by a laser beam. As shown in FIG. 15B, marks such as "0%" to "100%" may be printed on the laser card adjacent to the display zone 190 in order to allow one to see the remaining amount of memory capacity at a glance.

Figure 16A:
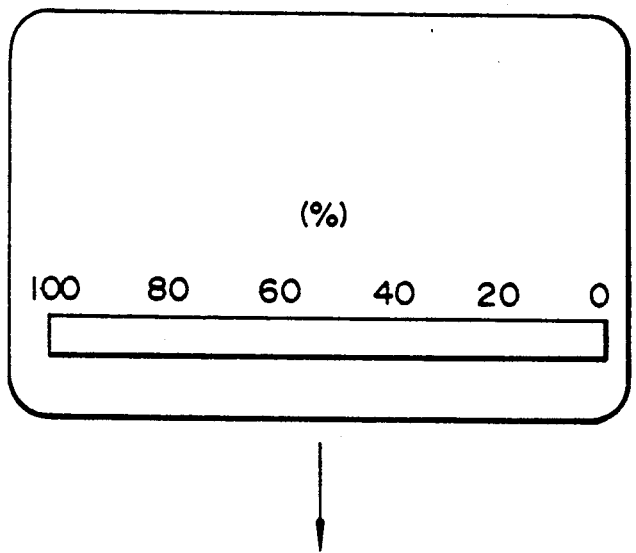
FIG. 16A, 16B and 17 are views showing a laser card which is provided with a memory residual display area on its back.
Figure 16B:
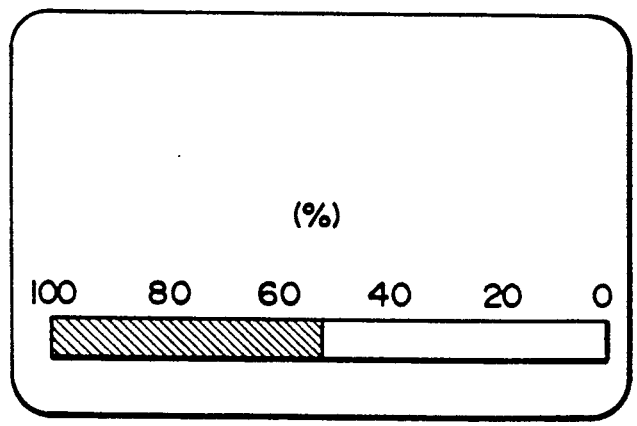
Figure 17:
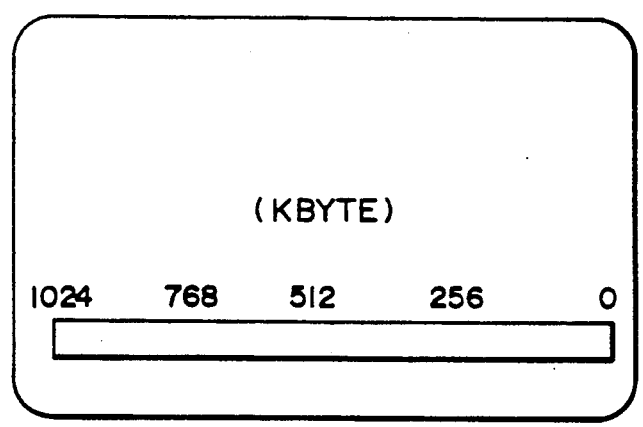

As shown in FIGS. 16A and 16B, the remaining amount of memory capacity may be displayed on the back of a laser card on a percent basis. FIg. 16A shows a fresh laser card while FIG. 16B shows a laser card 50% of which has been used. FIG. 17 shows another embodiment in which the remaining amount of memory capacity is displayed on a kilobyte basis.

Figure 18:
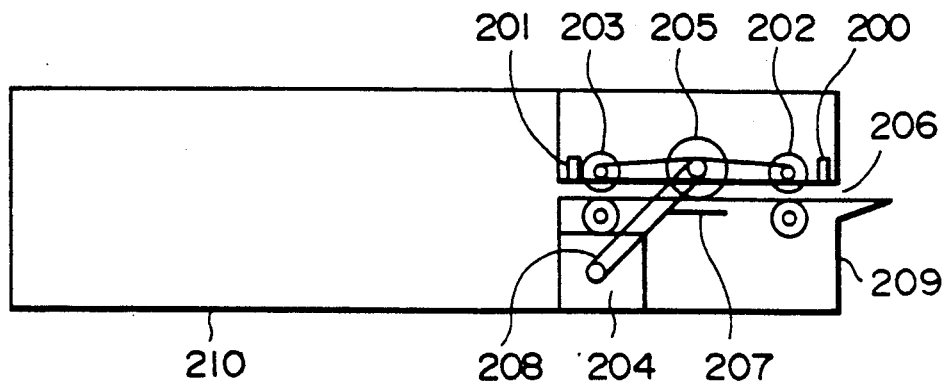
FIG. 18 is a schematic elevation showing a laser card reader/writer to which a memory residual recording section is affixed.

Referring to FIG. 18, there is shown a card reader/writer 210 to which a residual recording section 209 is affixed. The card reader/writer 210 with the residual recording section 209 includes a pulse motor 204, two sensors 200 and 201, and a thermal head 207 which are controlled by the LCC. When a card is inserted into a transport path 206, the sensor 200 senses the card and drives the pulse motor 204. The pulse motor 204 in turn rotates a platen 205 and transport rollers 202 and 203 by a timing belt 208. Hence, the card is transported deeper into the card reader/writer 210. After the sensor 201 has sensed the trailing end of the card, the pulse motor 204 is deenergized upon the lapse of a predetermined period of time. After data have been written in or read out of the card, the card transported outward from the reader/writer 210 is sensed by the sensor 201 and, then, the pule motor 204 is rotated. The pulses which appear during the interval between the instant when the card turns on the sensor 201 and the instant when it reaches the thermal head 207 thereafter are counted by means of the pulse motor 204 to determine the amount of memory used. Then, the thermal head 207 is turned on to print out a residual of the memory capacitor. Upon the lapse of a predetermined period of time after the card has moved past the sensor 200, the pulse motor 204 is deenergized.

When the card is inserted as stated above, the laser card control unit begins to scan it, the first block of the first row first, so as to determine a remaining amount of memory of the card. For example, when the first block of the first row to the twenty-eighth block of the fifth row are occupied, the residual is $5 \times 32 + 28 = 188$ kilobytes. While the amount of data associated with a single paper of format A4 is 1,707,855 bytes (940 kilobytes) as produced by $210 \times (400/25.4) \times (148 \times 400/25.4)$, they are two-dimensionally compressed by a controller associated with the compander and, thereon, the amount of data is reduced to about 1/16, i.e. 59 kilobytes. The reduction to 1/16 is an average value attainable by compressing eight CCITT standard documents by a two-dimensional MR. Table 1 shows compression ratios. In table 1, 1D is representative of the one dimensional compression and 2D, the two-dimensional compression. For example, when the remaining amount memory is 836 bytes, it is represented by fourteen papers as produced by 836/59. These data are serially fed to the main controller which then serially delivers them to the operation board, resulting that such a message as "RESIDUAL-14 PAPERS IN TERMS OF A4" appears on the operation board. Another implementation for alerting the user to such a remaining amount of memory is printing it on a part of a card by a thermal recording system.

It is to be noted that the reduction ratio of 1/16 is an average value. In practice, since the documents handled differ from one kind of work or type of industry to another, an arrangement is made such that one enters a desired compression ratio on the operation board by using numeral keys, dip switches, etc.

TABLE 1

| | 1D | | | 2D | | |
|---|---|---|---|---|---|---|
| D# | WY | MH | SAC(AB) 2 BINARY | READ | MR | MR2 AMR |
| 1 | 16.3 | 17.3 | 18.3 | 30.9 | 31.0 | 31.6 |
| 2 | 17.5 | 17.7 | 19.1 | 53.3 | 48.3 | 50.49 |
| 3 | 9.2 | 9.5 | 10.4 | 19.3 | 20.5 | 20.4 |
| 4 | 5.4 | 5.6 | 5.9 | 7.9 | 8.2 | 8.2 |
| 5 | 8.8 | 9.2 | 9.7 | 17.3 | 18.0 | 18.1 |
| 6 | 10.7 | 11.4 | 12.3 | 32.6 | 33.5 | 33.6 |
| 7 | 4.9 | 5.2 | 5.0 | 7.8 | 7.4 | 7.7 |
| 8 | 9.3 | 8.9 | 9.8 | 29.3 | 27.5 | 28.1 |
| AVR | 8.6 | 8.9 | 9.3 | 16.7 | 16.6 | 16.9 |

In the case that one tries to store data in the memory without compressing them despite the limited memory capacity, a code indicative of short memory capacity is applied to the main controller so as to provide such a message on the operation board.

When data are compressed (by a two-dimensional MR), the following conditions are set up:
1st document, $940/31 = 30.3$ kilobytes.
2nd document, $940/48.3 = 19.5$ kilobytes.
3rd document, $940/20.5 = 45.9$ kilobytes.
4th document, $940/8.2 = 114.6$ kilobytes.
5th document, $940/18 = 52.5$ kilobytes.
6th document, $940/33.5 = 28.1$ kilobytes.
7th document, $940/7.4 = 127.0$ kilobytes.
8th document, $940/27.5 = 34.2$ kilobytes.
Hence, all the documents can be accommodated in the memory. However, when the residual of memory capacity is 50 kilobytes, only the first, second, thrid, sixth and eighth documents can be stored in the memory and, therefore, a warning has to be displayed for the fourth, fifth and seventh documents.

The present invention is applicable not only to a single document as stated above but also to a series of documents which are to be copied together. Specifically, the operator loads the ADF with a stack of documents and, then, depresses the start button. In this condition, the documents are sequentially fed from the ADF, and the data read out by the scanner are applied to the laser card control unit. The data written in the bit map memory of the control unit are compressed and, then, written in the buffer memory. In this instance, if the capacity of the buffer memory is less than the residual amount of memory read at the time of card insertion and if any other document is to follow, the same procedure is repeated. If no other documents are present, the data stored in the buffer memory are written in the card. Further, if the capacity of the buffer memory is greater than the residual amount and if the document is the first one, a message such as "CHANGE CARD" is displayed to urge the user to replace the card. In this case, after the residual of memory capacity of the new card has been detected, the user turns on the print switch to effect the previously stated operation. If the document is not the first one (e.g. "n" document), data associated with the documents up to "n−1" are written in the card and followed by an identification (ID) code which is indicative of the presence of data to follow. Simultaneously, the data associated with the first to the "n−1" documents stored in the buffer memory are deleted, and a warning is displayed. This is followed by the same operation as performed with the first document. When copies are produced by using the card and if the data in that card are followed by an ID code, a message such as "MORE COPIES—CHANGE CARD" is provided to urge the user to change the card.

As described above, one can effectively use a memory when he or she desires to write data in the card and can produce a series of copies out of the copy without any complicated procedure.

Hereinafter will be described other embodiments of the present invention in which the amount of data is reduced by reduction before the data are stored in a card.

If the residual of memory capacity is only 50 kilobytes when the data are two-dimensionally compressed as shown in Table 1, only the first, second, sixth and eighth documents can be accommodated while a warning is displayed for each of the fourth, fifth and seventh documents by calculating their reduction ratios. For example,
4th document, $50/114.6 = 43.6\%$.
5th document, $50/52.2 = 95.8\%$.
7th document, $50/127 = 39.4\%$.

In the above conditions, for the fourth document, for example, a message "OK REDUCTION BY 53.6?" or the like is provided. If the user looking at such a message depresses a write button on the operation board, the data are written in the card at the reduction ratio of 43.6%. Specifically, when the residual amount of memory is extremely small, the user is informed of the reduction ratio because excessive reduction of image data would render the data reproduced illegible. In fact, data reduced by more than 25% cannot be easily read when printed out. When the user depresses a cancel button instead of the write button, the card is automatically ejected.

It is the image data stored in the buffer memory that is to be compared with the residual of memory capacity. When reduction is to be effected, the image data stored in the bit map memory are reduced by software processing, compressed, and lodged in the buffer memory. Simultaneously, data indicative of the reduction ratio is written together with the image data.

Figure 19:
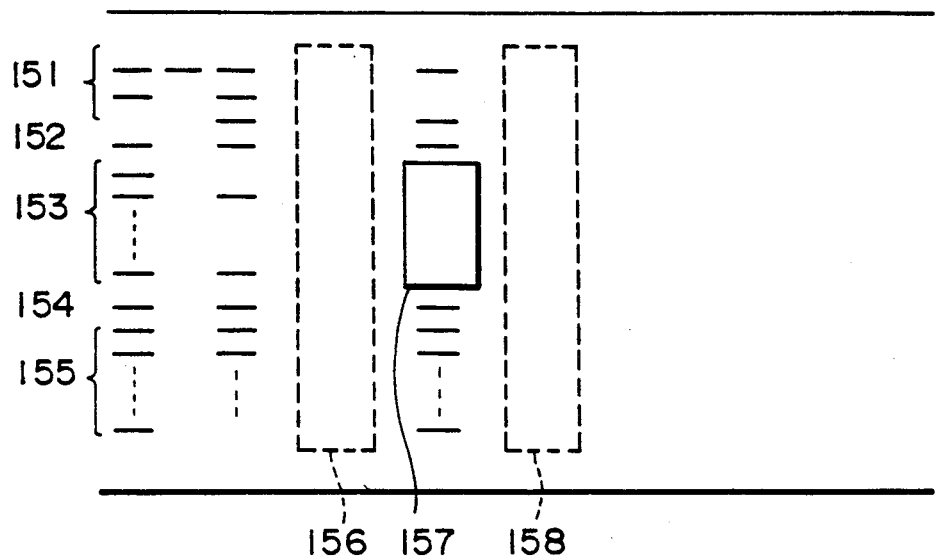
FIG. 19 is a view of a laser card in which image data are written.

FIG. 19 shows an implementation for discriminating image data and code data. As shown in the figure, after data have been written in the data bits 153 of the card, one entire column of a data end portion 156 is left blank or made ON, then magnification change data are written in a magnification change code end portion 157, and then the next entire column is left blank or made ON to define a magnification change code end portion 158.

Figure 20A:
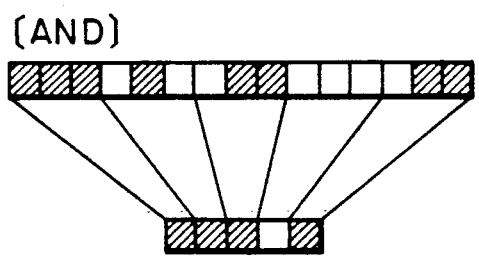
FIGS. 20A and 20B are schematic diagrams each showing a particular reduction system which uses software.
Figure 20B:
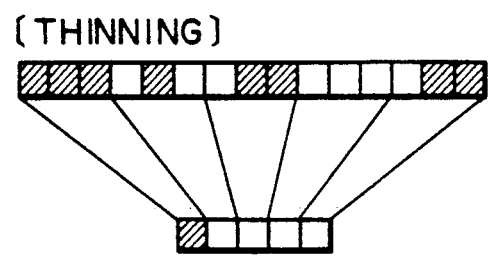
Figure 21A:
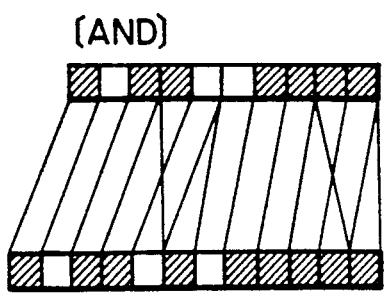
FIGS. 21A and 21B are views similar to FIGS. 20A and 20B, each showing a particular enlargement system which uses software.
Figure 21B:
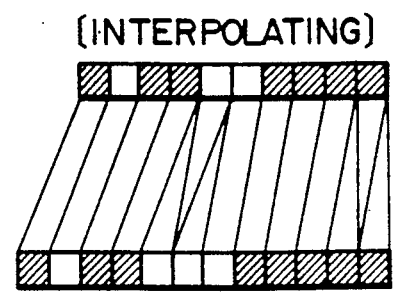

The reduction by software may be performed by any of the methods shown in FIGS. 20A and 20B. In a read mode, data are read out of the card and stored in the buffer memory via the LCC. The last data lodged in the buffer memory is the magnification change data and, therefore, written in a random access memory (RAM) of the main storage. Thereafter, the data are expanded and stored in the bit map memory. The image data stored in the bit map memory so are written in the main store to be converted to (1/magnification). Specifically, the MPU changes the magnification of the data stored in the bit map memory by software. For such a magnification change, any of the method which produces OR (FIGS. 20A and 21A), the method which uses thinning (FIG. 20B), and the method which uses interpolation (FIG. 21B) may be adopted. This is an exemplary approach for effecting reduction and enlargement by software.

As stated above, the image data are processed to the size of the original image based on the magnification change data and, then, applied to the printer. The magnification data specified by the scanning section are serially fed to the main store and, therefrom, to the scanner. In response to a start signal, the scanner starts on the processing based on the magnification specified. The magnification change in the main scanning direction is electrically effected while that in the subscanning direction is effected by changing the scanning speed of the optics.

Data from the scanner are applied to the laser card unit to be stored in the bit map memory. Magnification data are serially fed from the main store to the laser card unit to be written in the RAM. The data in the bit map memory are compressed, then stored in the buffer memory, and then stored in the card in a predetermined format by the LCC. At the end of the image data, the magnification change data lodged in the RAM of the main store are added. The end of an image may be identified relying on a full blank column or a full ON column, as previously stated.

As stated above, the capacity of an external storing medium can be sufficiently effectively used and, in addition, image data can be restored to the same size as the original document.

Next, implementations for protecting image data in a digital copier of the type using a storing medium will be described.

Figure 22:
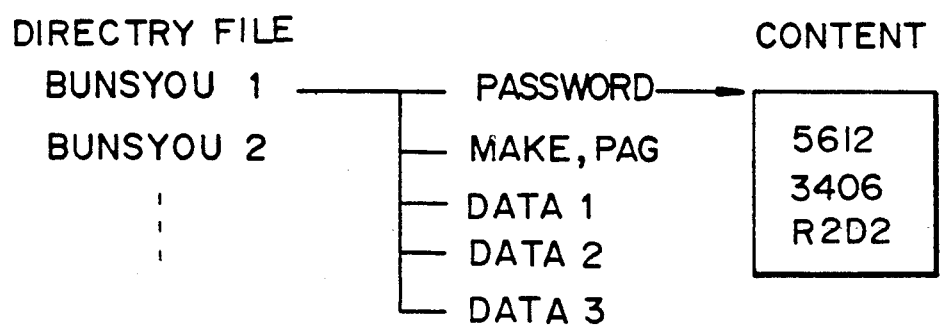
FIG. 22 is a view of a directory which includes a password associated with image data.

Referring to FIG. 22, one of such implementations which is applicable to an unremovable recording medium and uses a password is shown. Specifically, a password is recorded in a recording medium together with a directory in the event of writing image data in the medium. If a password file is present, the main controller checks a password stored therein when it reads out an image. If a password entered on the operation board by a person is not coincident with the password stored, the main controller inhibits the image data from being printed out. If necessary, each directory may be provided with a single password file. A plurality of passwords may be written in the password file.

Figure 23:
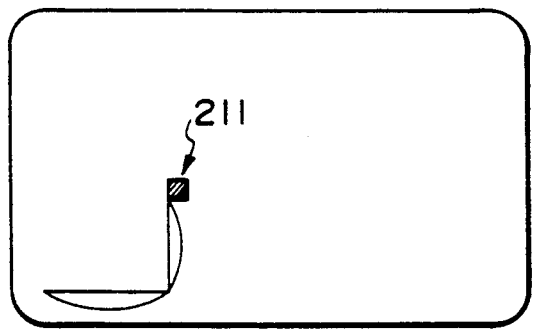
FIG. 23 is a view of a laser card which is provided with an exclusive block for the password.

Another implementation for protection is applicable to a removable storing medium such as a laser card. Specifically, when a laser card or like removable medium is used, the use of a password only is insufficient to guarantee secrecy because the password is readable by using an extra device. In accordance with the present invention, a password is buried in the card itself. As previously described, in a digital copier, image data are recorded by run-length compression and reproduced by expansion. While run-length code conversion is standardized, modifying even a part of the code conversion renders an image meaningless. Based on this fact, as shown in FIG. 23, one block 211 of a laser card is assigned to a password while, at the same time, the position of this particular block 211 is defined in terms of CRC (cylic redundance) of the password. A code conversion table which is a random code table is written in the block 211. It is almost impossible to fabricate the same random code table, or password, as another.

Figure 24:
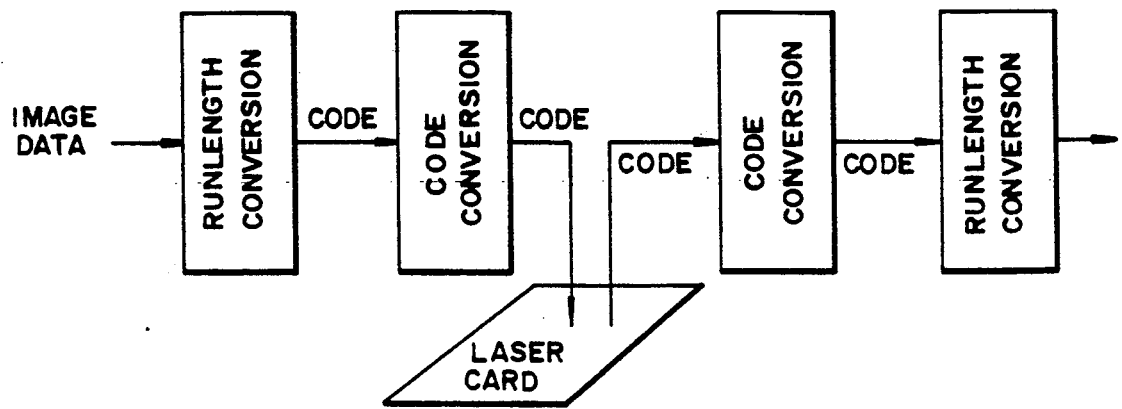
FIG. 24 is a schematic diagram showing how image data are read out of a protected laser card.

Image data protected as stated above are recorded and reproduced by a particular flow as shown in FIG. 24. It will be seen from FIG. 24 that image data printed out simply appear meaningless if without the code conversion table, whereby secrecy is guaranteed. Finding out the password block which is buried in the image data blocks is almost beyond the range of possibilites.

In the manner described, an image stored in a removable storing medium is protected against use by unauthorized persons.

Other embodiments of the present invention will be described in which, to promote effective use of a storing medium, bit data associated with graphic data and character codes associated with character data are stored independently of each other in the same storing medium.

Figure 25:
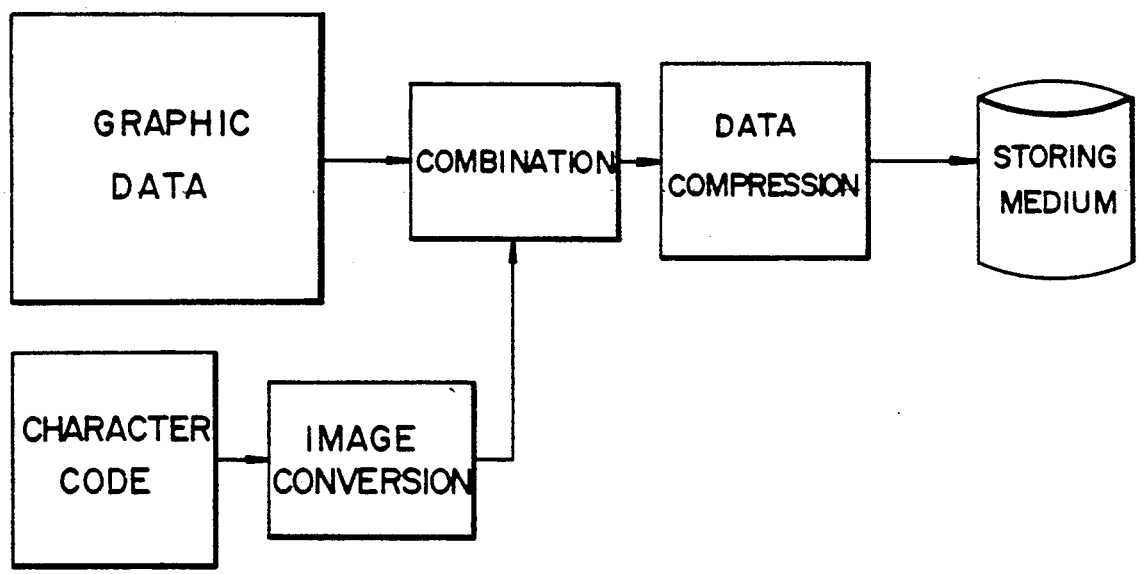
FIG. 25 is a schematic block diagram showing a prior art storing method.

FIG. 25 shows a prior art system for reading graphic data and character data. In this case, graphic data are produced by converting image light into an electric signal and, therefore, a ZERO and a ONE of each bit directly corresponds to white and black (or black and white) of a picture. On the other hand, character codes are converted into bit images of the same specification as the image data so that they may be combined with the image data. Combining the bit images of image data and those of character data allows characters and pictures to coexist. However, data compression is indispensable in storing data in a storing medium, bringing about a problem as follows. Assuming that a character code representative of one character is converted into a bit image of 32 dots ×32 dots, a character which can be represented by one byte of code is transformed into 128 bytes of bit image. Since data are usually compressed approximately to 1/6 to 1/20, even a bit image corresponding to a code of one byte needs a storage capacity of 6 bytes to 20 bytes when compressed.

On the other hand, assuming that one page of picture data corresponding to format A4 are read at 400 dpi×400 dpi, about 2 megabytes of bit images are produced which have to be coped with by a storage capacity of 100 kilobytes to 300 kilobytes even if compressed. Assuming that about 8,000 characters are printed on one page of format A4, 8 bytes of codes are converted into about 50 kilobytes to 150 kilobytes of bit images requiring a corresponding capacity for storage. In order that graphic data and character data may be combined in one page of format A4, a storage capacity great enough to accommodate 100 kilobytes to 300 kilobytes of compressed image data is needed. Usually, a picture occupies only a small part of one page while characters occupy almost all the area of one page. Hence, when a picture occupies one-eight of an A4 page and characters occupy seven-eighths of the same page, a storgage capacity of 50 to 150 kilobytes is needed for bit images of characters.

Figure 26:
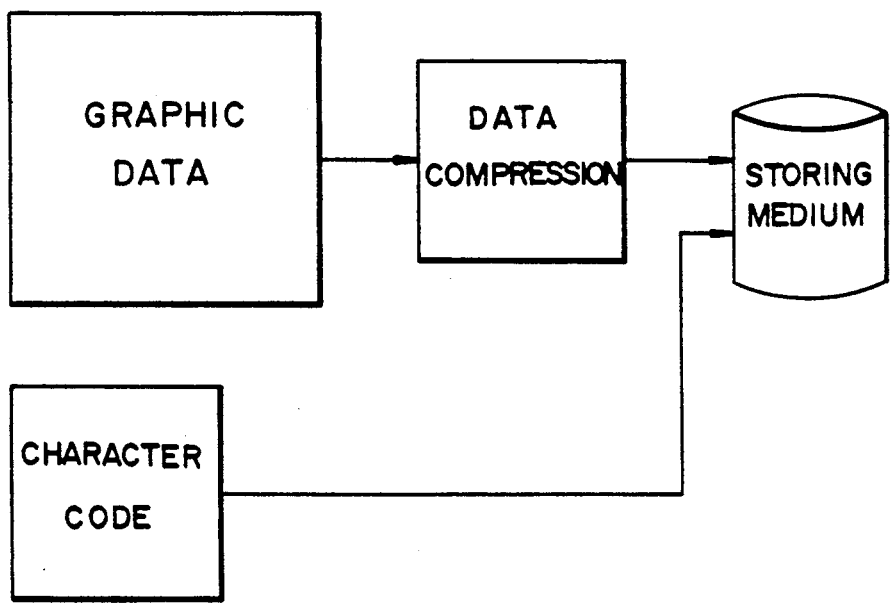
FIG. 26 is a block diagram showing a storing method in accordance with the present invention.

FIg. 26 schematically shows an embodiment of the present invention. As shown, character codes are directly stored in a storing medium without being transformed into bit images while graphic data are stored in the medium after compression as practiced in the prior art system. In this condition, only 8 kilobytes at maximum are needed to store characters. Even if a picture printed in one-eighth of an A4 page and characters printed in seven-eights of the same page are combined, a storage capacity of not more than 10 kilobytes to 40 kilobytes suffices, promoting effective use of a storing medium.

Figure 27:
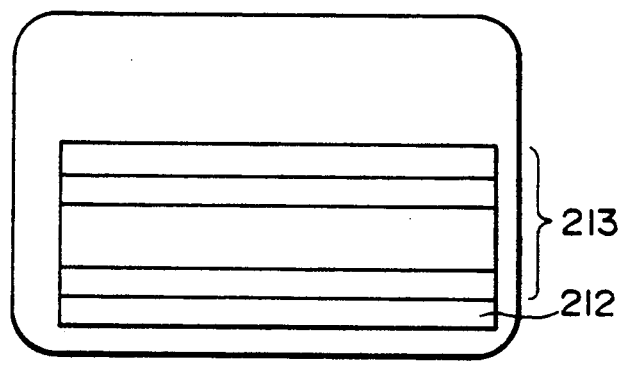
FIGS. 27 and 28 are views of a laser card in which data are stored by the method in accordance with the present invention.
Figure 28:
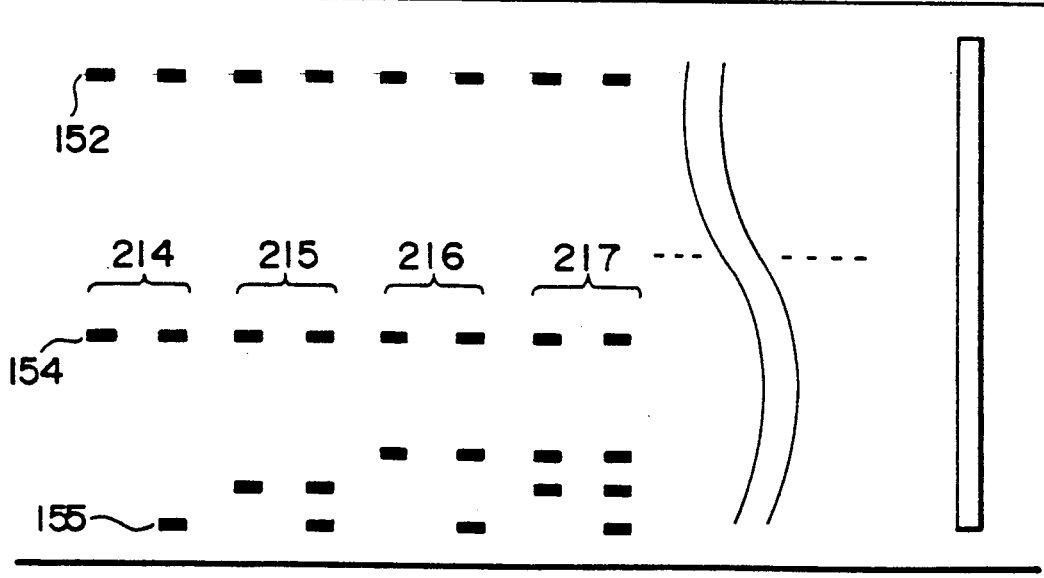

As shown in FIG. 27, the first row of a laser card is used for a data ID area 212 for writing data ID information while the second row and onward are used for data areas 213 for storing data. FIG. 28 shows how data are identified. In FIG. 28, the character code store area (from which block of which row to which block of which row) and the graphic data store area associated with each page are sequentially and alternately stored from the first column of the first block of the first row. Specifically, in FIG. 28, the reference numeral 214 designates a character code store area associated with the first page, 215 a graphic data store area of the first page, 216 a character code store area of the second page, and 217 a graphic data store area of the second page. The present invention is practicable because, as shown in FIGS. 3A and 3B, the data DATA1 and DATA2 output by the scanner are compressed and recorded by the laser card unit while, at the same time, the character codes are recorded by applying input codes from the outside to the laser card unit by serial communication via the interface unit.

Figure 29:
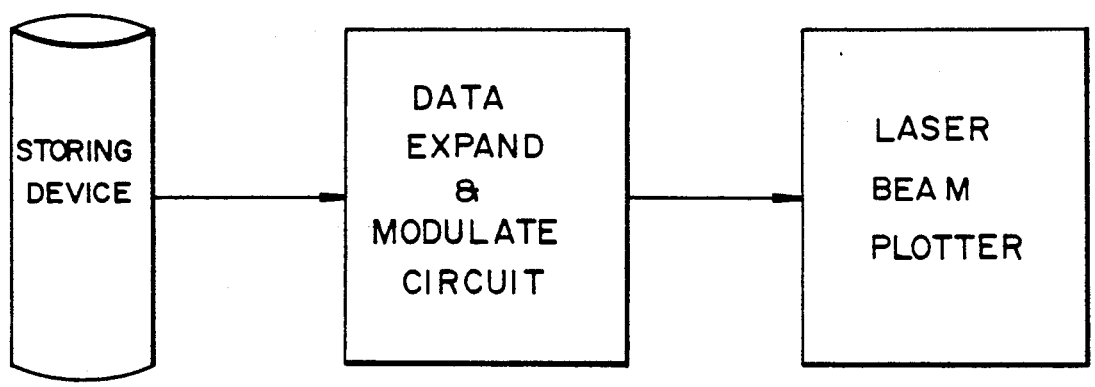
FIG. 29 is a schematic diagram showing how data are outputted from a storing device to a plotter by the prior art method.

FIG. 29 shows a prior art outputting system. Bit image data stored in a storing medium are directly expanded and, then, fed to a laser beam plotter via a modulation circuit to be printed out on a paper. Although such a prior art system is simple in construction, a large-scale storing device such as one using an optical disk is indispensable because graphic data and character data, which are transformed into bit images, are extremely large in amount.

Figure 30:
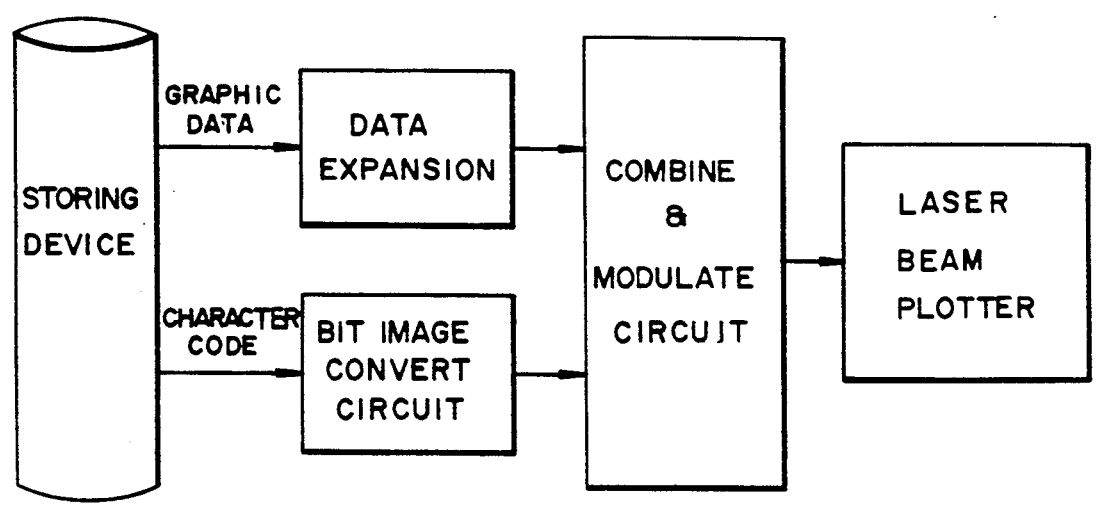
FIG. 30 is a schematic block diagram showing how data are outputted from a storing device to a plotter by the method of the present invention.

An outputting system in accordance with the present invention is shown in FIG. 30. In this embodiment, a storing device discriminates graphic data and character codes recorded in a recording medium from each other and delivers each of them to different processing means. While this kind of construction may be somewhat complicated, the storing device is miniaturized due to the effective use of a storing medium (especially when a great number of characters are present), cutting down the cost of the entire equipment. The laser card control unit sequentially reads out character codes, the leading address first. The character codes are fed to the interface unit, FIG. 3A, via the serial port. Corresponding to an image converter circuit of FIG. 30, the interface unit converts the character codes into bit images which are then applied to the terminals DATA 1 and DATA2. On the other hand, the laser card control unit sequentially reads out graphic data from the leading address and, then, applies them to the terminals DATA1 and DATA2 after expanding them. These outputs and the outputs of the interface unit are fed to the gate array, FIG. 3B, to produce a signal for modulating the laser beam. It is to be noted that the output timing from the laser card control unit and that from the inteface unit are synchronized under the control of the CPU (b), FIG. 3A.

Another embodiment of the present invention will be described which allows an operation manual, service manual and others of, for example, a digital copier to be stored in a laser card.

Figure 31:
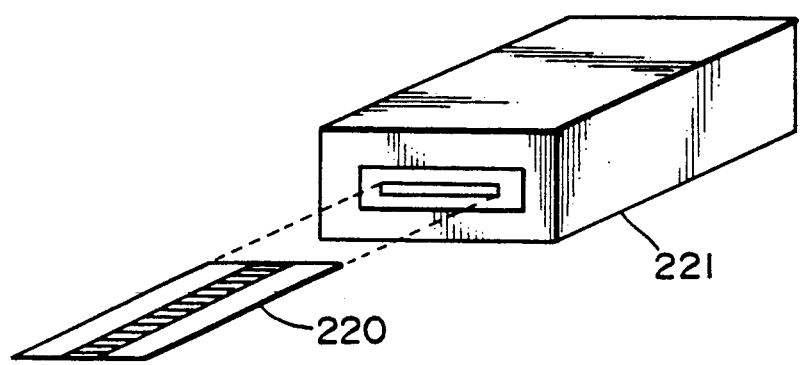
FIG. 31 is a front view of a laser card device.
Figure 32:
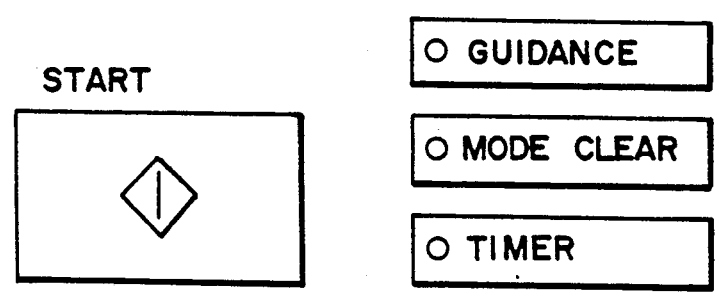
FIG. 32 is a schematic view of an exemplary key arrangement of the digital copier in accordance with the present invention.

As shown in FIG. 31, this embodiment basically comprises a laser card unit consisting of a laser card 220 in which manuals and others are recorded and laser card device 221 affixed to a copier for reading an electric signal out of the laser card 220, and a printing mechanism. The laser card unit functions to control data as well. In operation, one inserts the laser card 220 into the laser card device 221 and, then, depresses a guidance key which is provided on the operation board. This causes a light emitting diode (LED) associated with the guidance key to turn on to show that a guidance mode is set up. Subsequently, as the operator depresses the start key, a summary page is read out of the laser card and fed to a printer. Then, the operator may depress the start key again to print out all the pages which contain descriptions. Alternatively, after the depression of the guidance key, the operator may depress any of operation keys to print out a particular key guidance page which is associated with the key depressed, the key guidance page showing how to operate.

Figure 33:
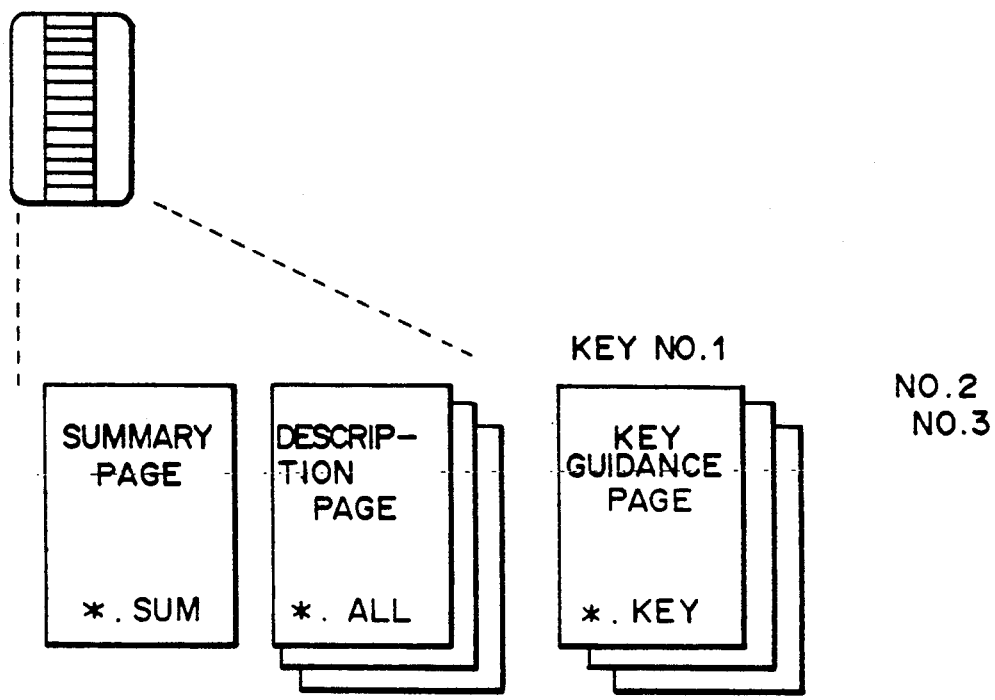
FIG. 33 is a view of a document file which is stored in a laser card.
Figure 34:
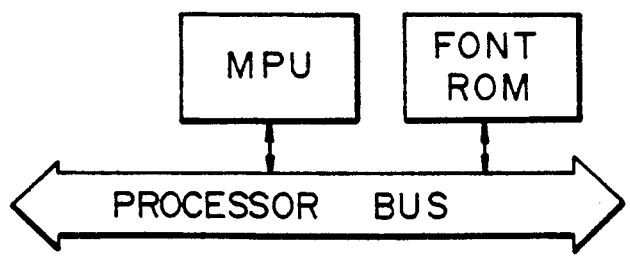
FIG. 34 is a schematic block diagram of a laser card unit which is provided with a FONT ROM.

The laser card 220 stores document file such as shown in FIG. 33. The main controller which supervises the entire copier scans file names which are stored in a file name directory and, the, reads out a filed label "*·SUM" as a summary page. The label "*·ALL" is adapted for all pages, and the label "* Non. KEY" is adapted for guidance. The data stored in the file may be graphic data or, if the laser card unit includes a font ROM as shown in FIG. 34, they may be code data which can be converted into image data by the MPU. The main controller supervises the laser card control unit and applies various commands to the latter. In response to such commands, the laser card control unit controls the flow of image data to read them out and write them in the laser card.

As described above, so long as an operation manual and other documents are stored in a laser card and inputted in a laser card device, a person can be guided by the machine itself for any desired operation.

Still another embodiment of the present invention will be described. In this embodiment, a schedule and other format data which are frequently used are recorded in a laser card and printed out as needed. A procedure for such an operation is programmed and stored in a laser card together with the format data. How this embodiment is practiced will be described with reference to FIG. 35.

Figure 35:
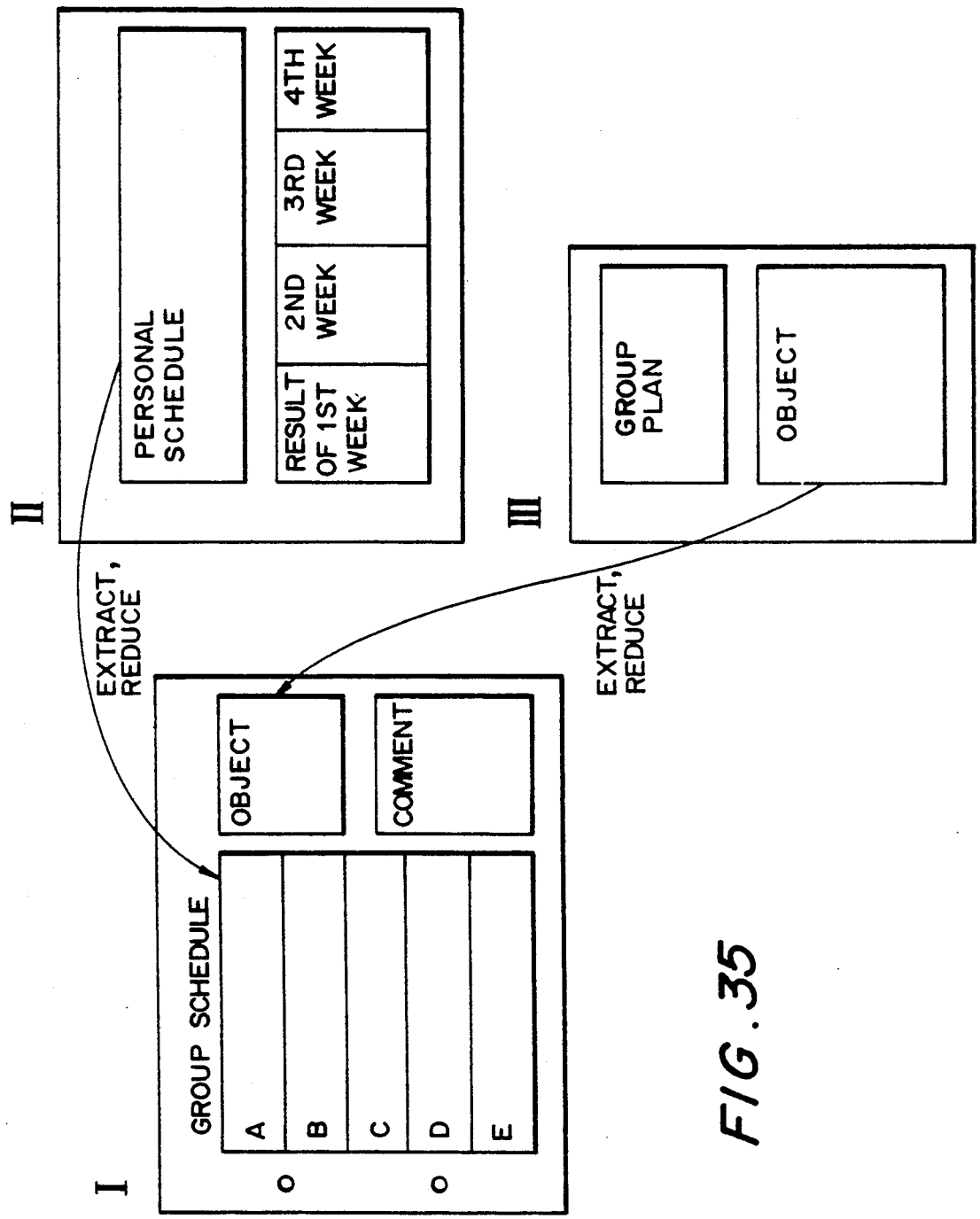
FIG. 35 is a view showing exemplary recording which uses format data.
Figure 36:
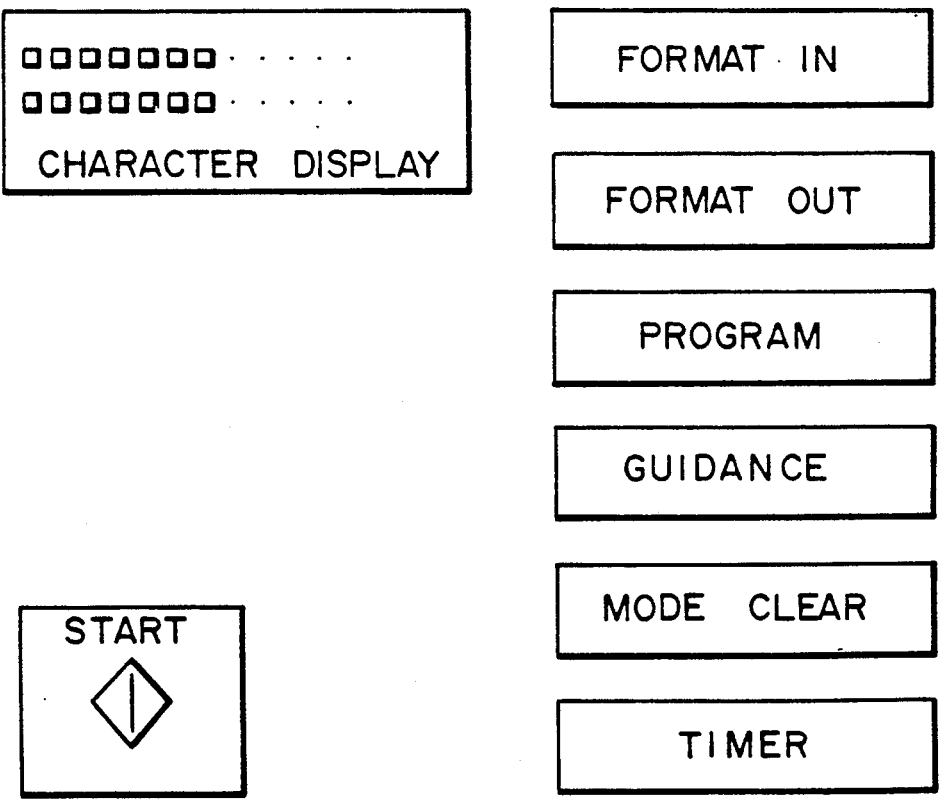
FIG. 36 is a view of an operation board of a copier.

In FIG. 35, designated I is the format data which the copier generates. In this example, the format data I show a collective schedule II of a certain group of persons. Columns A, B, C, D and E are each adapted to record the schedule of a person, e.g., the column A is assigned to a person A. A column labeled "OBJECT" is assigned to an object III as prepared by the leader of the group. All these data are combined in the collective schedule (I) to be printed out. The operating procedure begins with loading the ADF with the schedules of persons A, B, C, D, and E and the group leader plan in sequence. Then, a FORMAT OUT key shown in FIG. 36 is depressed and, subsequently, numeral keys are depressed to enter a format number. As a PROGRAM key is depressed, the format data and the operation procedure program are read out of the laser card to become ready to be printed out. This may be followed by setting a desired number of copies and other operations which are practiced with ordinary copiers. Finally, the start key is depressed to cause a programming operation based on the operation procedure program.

specifically, in the example shown in FIG. 35, the format data I are read out of the laser card and lodged in the bit map memory of the laser card unit. Then, the personal schedule A is fed by the ADF and, then, reduced by the scanner, whereafter a necessary portion of the personal schedule A is extracted. In the same manner, the other personal documents B, C, D and E are sequentially fed by the ADF and combined in the bit map memory. Finally, the group objects III is reduced, extracted, and combined with the other data to complete the group schedule I while, at the same time, the completion of the group schedule I is reported to the main controller. In response, the main controller delivers a command for delivering the image data from the laser card unit to the printer. Simultaneously, the main controller feeds a command to the printer for causing it punch a copy sheet based on the programmed operating procedure.

Figure 37:
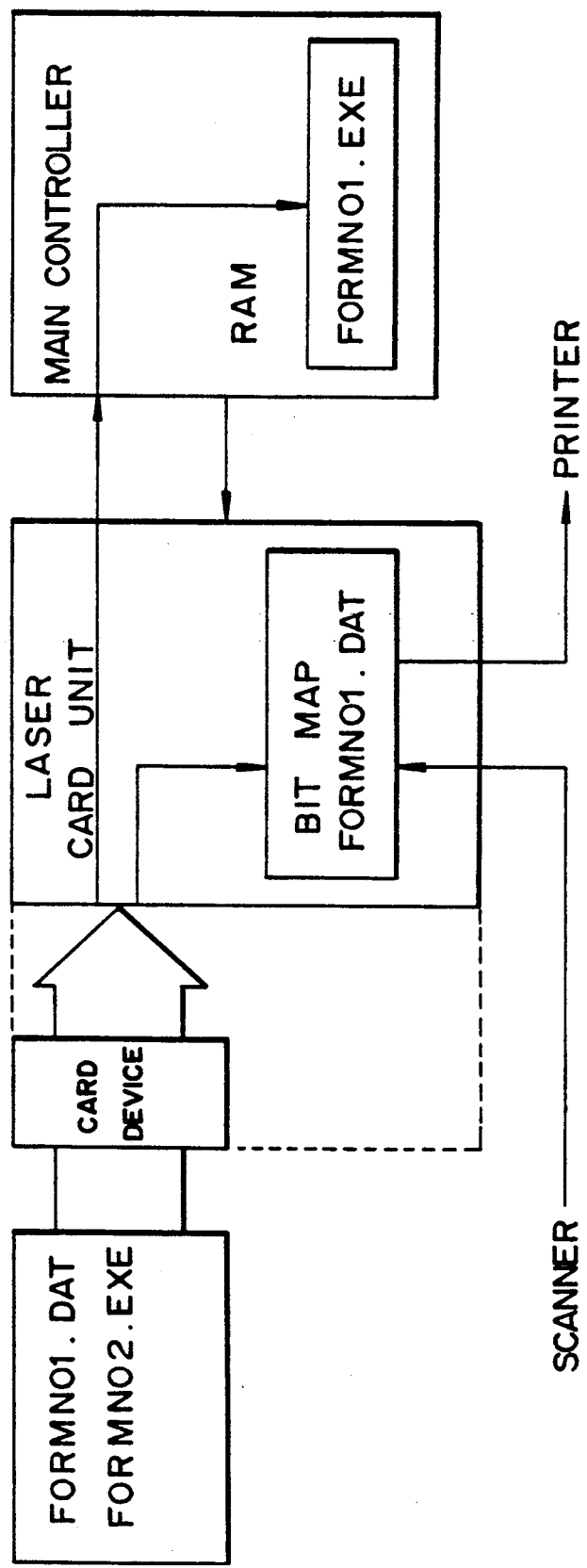
FIG. 37 is a block diagram showing how a laser card is loaded with data.

How the data stored in the laser card are loaded will be explained with reference FIG. 37. A directory file in the laser card stories directories FORMNO1, FORM-NO2 and so on. When a particular format number is entered on the operation board, one of the directories associated with it is selected so that data *. DAT located below the directory are developed in the bit map memory of the laser card unit as image data. A file *. EXE is applied to the RAM of the main controller via the laser card unit to serve as the operation procedure program. Interpreting the program, the main controller controls the entire copier. The operation procedure program may include data which are associated with a display on the operation board, if desired. In such a case, those data will appear on a character display as shown in FIG. 36 at adequate timings to guide the operator. To register the format data in the laser card, a sequence of operations are performed after the depression of the FORMAT key and, then, the PROGRAM key is depressed to start copying. This causes the initially set image to be written in FORMNOn. DAT of the laser card while causing the sequence of operations to be written in the laser card as FORMANTNOn. EXE.

In a digital copier with a storing device, when imaging data are to be recorded in a laser card or like storing medium, it is necessary to record those data associated with a page (size, orientation and front/back) together with the image data. This is especially important when data are recorded after compression.

Figure 38:
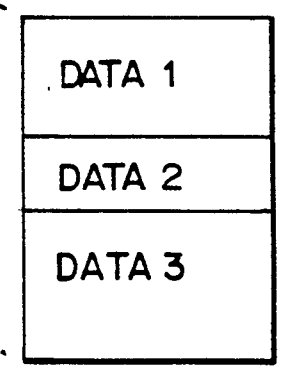
FIGS. 38 and 39 are views schematically showing data recorded.
Figure 39:
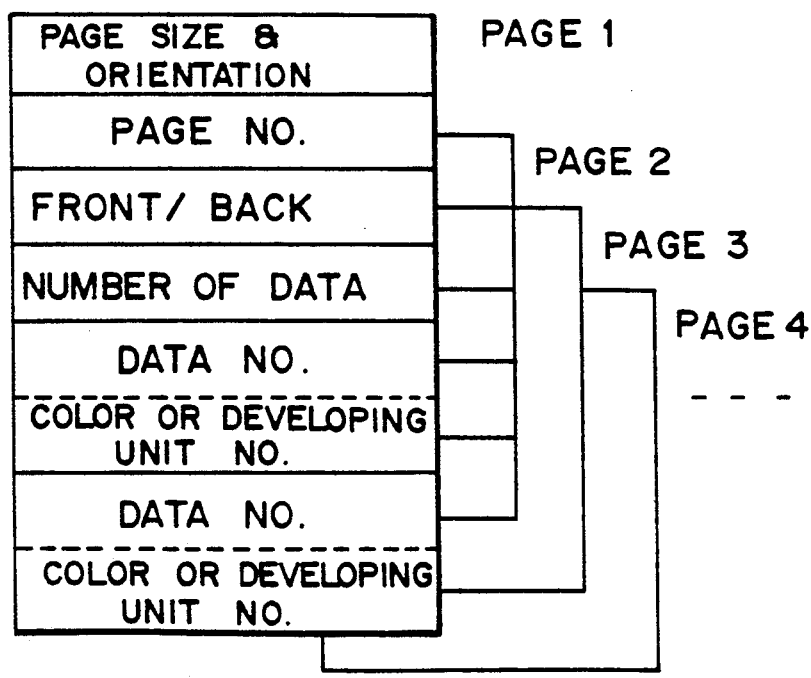

Still another embodiment of the present invention will be described. FIGS. 38 and 39 schematically show data which are stored in a laser card. In a directory file, directories such as BUNSHOU1 and BUNSHOU2 are stored, and all of the files for preparing one document are defined therebelow. Compressed image data are stored in image files DATA1, DATA2 and so on. Further, extra data associated with pages are stored in a file labeled MAKE PAG. The extra data stored in MAKE. PAG are constituted by a congregation of page tables the number of which is the same as the pages of a document. Listed in each of the page tables are store page size, page orientation, page number front/rear, number of image data constituting the page, data number indicative of a file in which the image data are lodged, and color for developing the image data or number assigned to a developing unit.

Figure 40:
FIG. 40 is a schematic view of a page allocation table.
Figure 41:
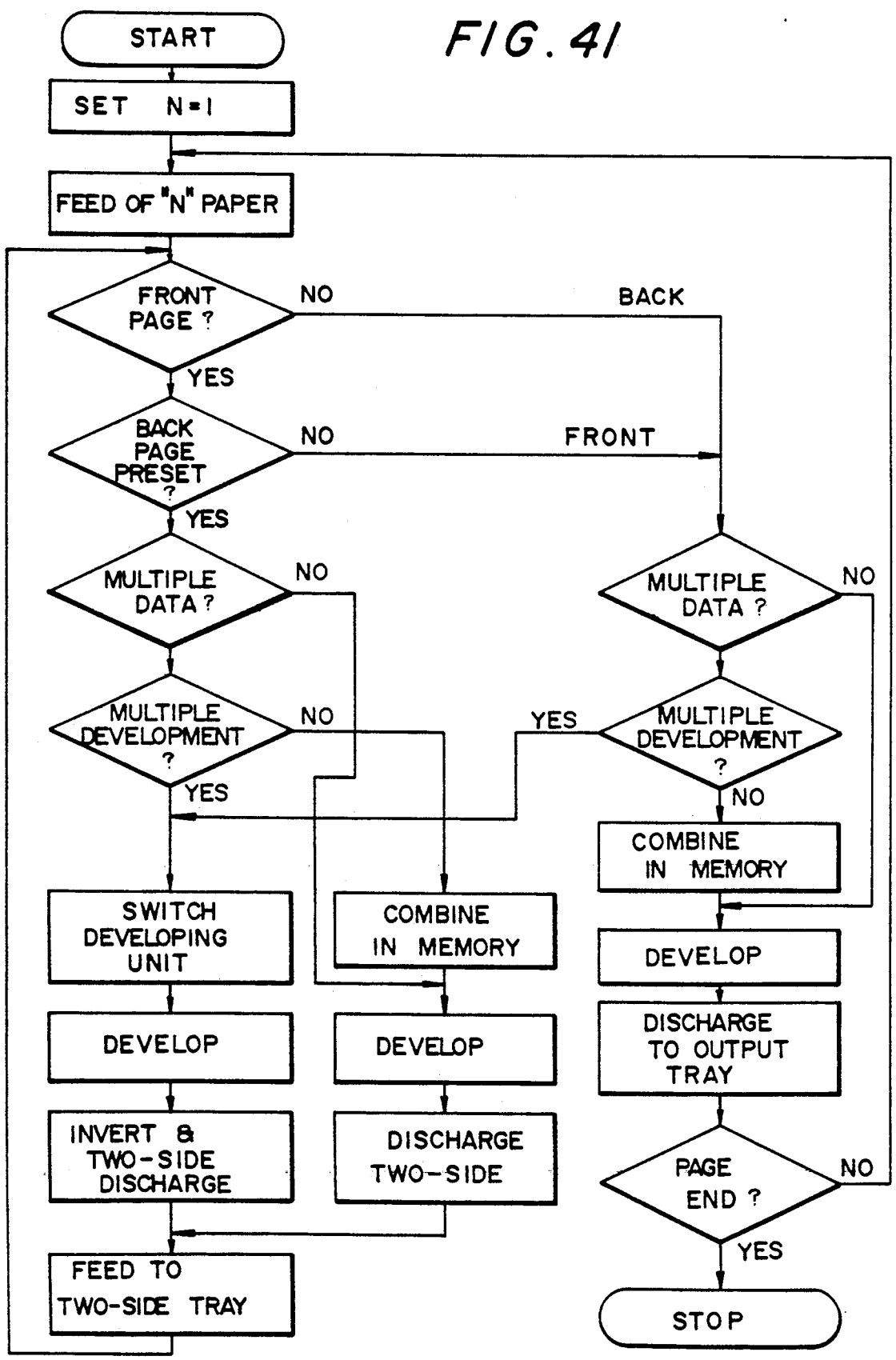
FIG. 41 is a flowchart demonstrating the algorithm of a main controller.

When it is desired to print out the document recorded in the laser card, the main controller searches a directly file through the laser card unit to see if a document corresponding to a document number entered is present. If the document is present, the main controller requests the laser card unit to output a MAKE. PAG file which is located below that directory. Then, the main controller prepares in its own RAM area a page location table as shown in FIG. 40, based on the page table group. Referencing the page location table, the main controller reads out necessary image data as shown in a flowchart in FIG. 41 and, at the same time, controls the printer to produce a hard copy. The algorithm of the flowchart shown in FIG. 41 consists in discharging a paper to a two-side tray when it has a page on its back, deciding whether a plurality of colors or a plurality of developing units should be used for a single page and copying in a combine mode by use of the two-side inversion unit, and combining data in the bit map memory of the laser card unit when a plurality of kinds of image data are present and the same developing units is to be used.

Figure 42:
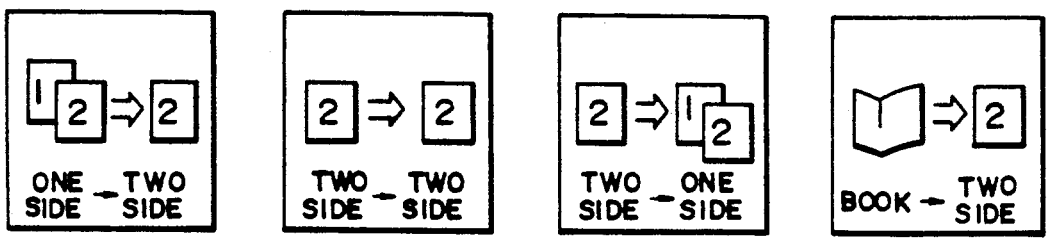
FIG. 42 is a view showing a part of the operation board in relation to an automatic document feeder (ADF)

As stated above, this embodiment is characterized in that a page format is recorded together with image data, and in that the page format has a page-by-page structure and accommodates a plurality of surfaces, a plurality of different kinds of image data, colors associated with the image data. Conversely, when a document is to be written in a laser card, the main controller feeds image data to the laser card unit while preparing such page tables. When the ADF is used, for example, a plurality of pages of documents are loaded on the ADF and, then, any of the keys shown in FIG. 42 except for the BOOK key is depressed. Then, the documents are automatically fed one by one from the ADF to the glass platen. The scanner sequentially reads the documents so that image data are written in a laser card while being compressed. At the same time, the main controller begins to prepare a page location table and, when the documents run out, converts the page location table into page tables and stores them in the MAKE, PAGE file.

As stated above, this embodiment allows both the image data and the extra data associated therewith and operation procedure program which are needed at the time of copying to be recorded in a laser card together. Hence, format data and an operation procedure program associated therewith may be recorded at the same time to facilitate automatic processing. Hereinafter will be described farther embodiments of the present invention which, in a digital copier, allow the pages of copies produced to be automatically put in order.

First, the ADF (II) shown in FIG. 1 will be described in more detail. Documents may be fed by the ADF (II) in either one of four different conditions with regard to the order and position, as shown in FIGS. 43A to 43D. Specifically, FIGS. 43A and 43C show a system in which the last document is fed first while FIGS. 43B and 43D show a system in which the first document is fed first. In accordance with this embodiment, the feed order of documents and the document feed system of the ADF are recorded in an image storing means at the same time. This allows one to print out images read out of the storing means without resorting to extra operations and in a properly collated condition. One embodiment will be described which uses a laser card unit.

Assuming that a document of format A4 is read at 400 dpi to produce image data, although it requires a storage capacity of about 2 megabytes, the amount of data can be compressed to 1/6 to 1/20 as previously stated. Hence, a single laser card having a capacity of 1 megabytes can accomodate three to ten A4 documents. However, the capacity of a single laser card may be exceeded depending upon the document feeder. In the light of this, there are defined in a laser card an image data area which is exclusively assigned to image data, and an extra data area assigned to the feed system of the document feeder, order of pages, document feeder used/non-used, and, when the capacity of one card is exceeded, recording over a plurality of cards.

Figure 45:
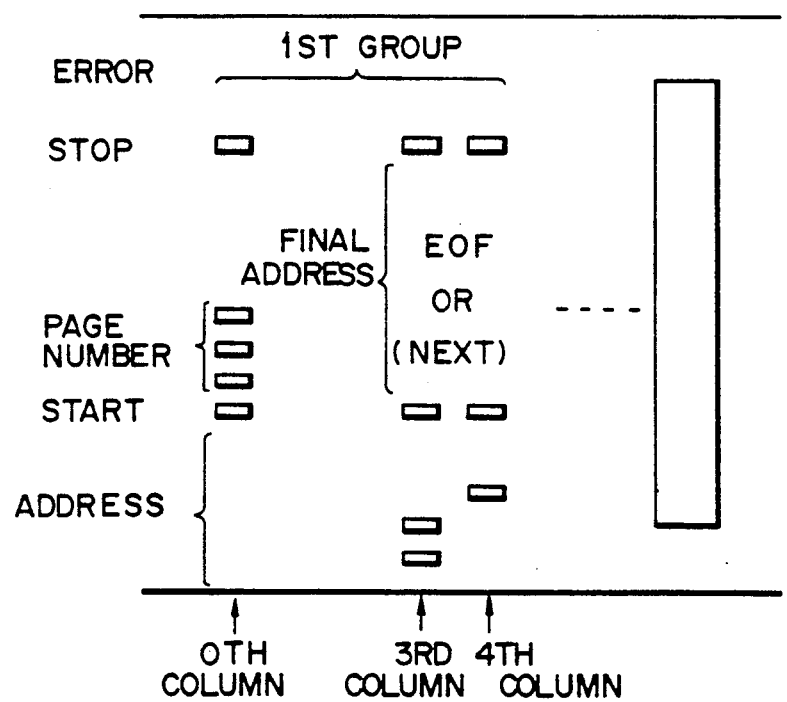

The laser card shown in FIG. 12, for example, is configured such that the first row serves as an extra data area and the second to the thirty-second rows serve as image data area. A heading may be entered on the operation board. As shown in FIG. 45, the number of pages recorded in the card, the last address of image data recorded, whether a series of image data have been filed (EOF), and whether a series of image data continue to the next card (NEXT) are recorded in the second block of the first row. In the condition shown in FIG. 45, it is recorded that three pages of image data were fully written (EOF) in the laser card to the last address (which column of which block of which row). If any further image data can be recorded in the card as decided by referencing the last address, the same format is recorded after the entry of data. When the capacity of the card is exceeded, a code NEXT is stored showing that the recording operation is handed over to the next card.

Figure 46:
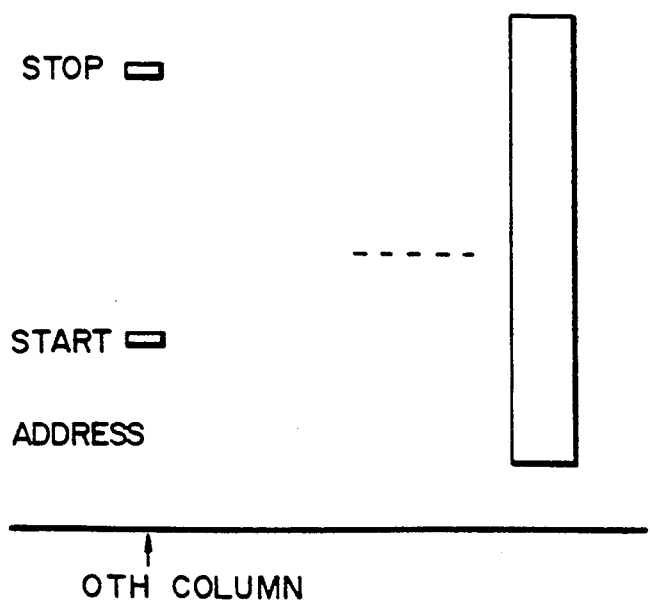
Figure 47:
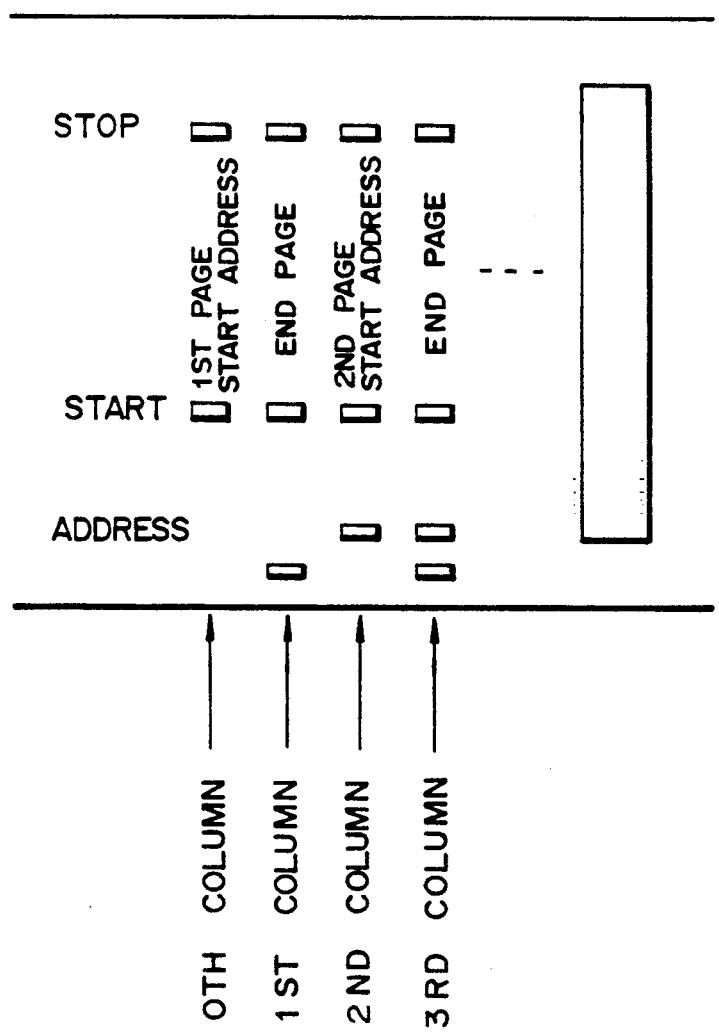

The the third block of the first row of the card is shown in FIG. 46. This block stores a feed order of documents as effected by the ADF. As shown in FIG. 47, the fourth block and onward of the first row store a start and an end address (which column of which block of which row) is stored on a page-by-page basis. The EOF code contains data which shows whether or not the ADF was used.

Figure 48:
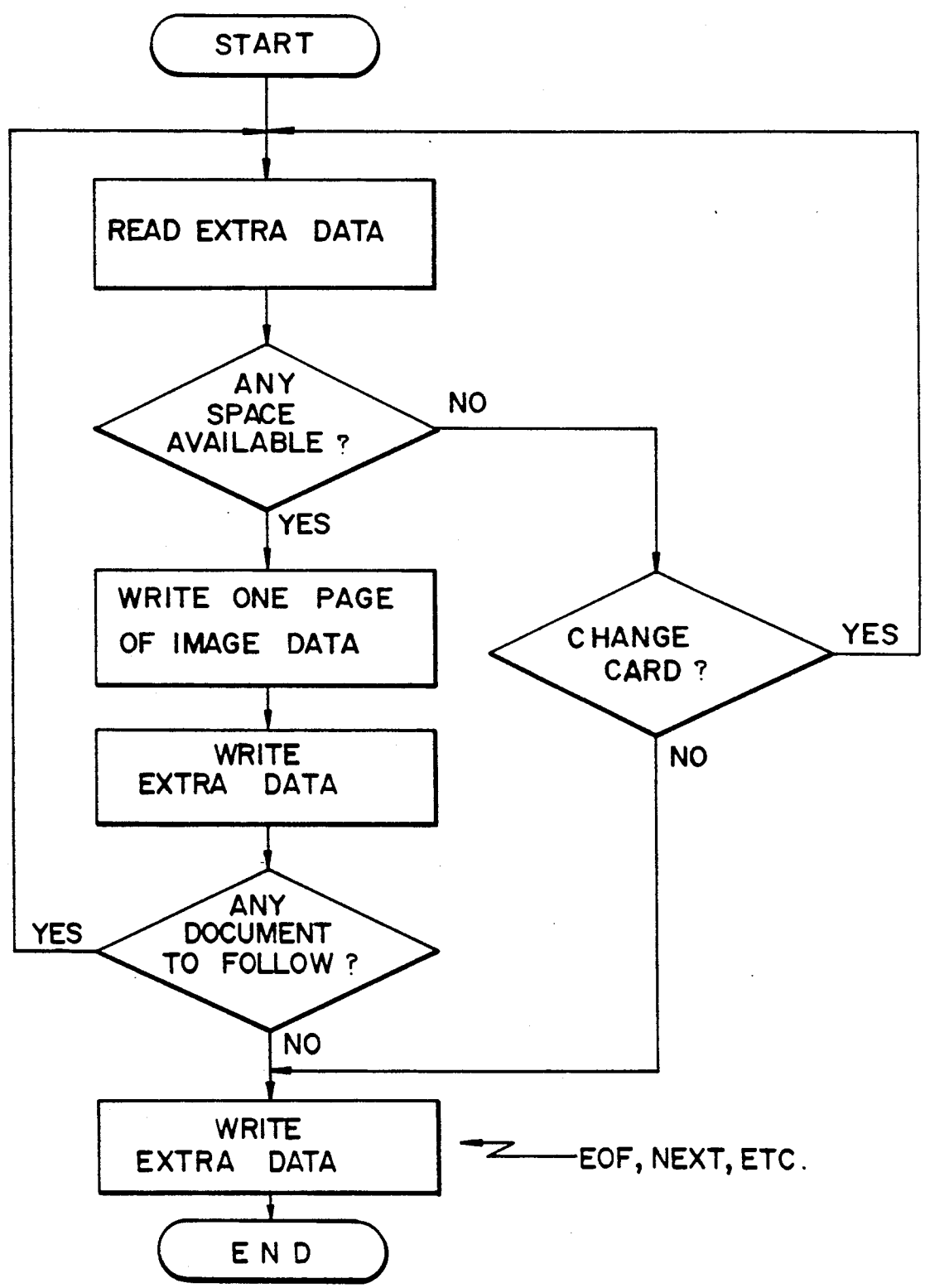
FIG. 48 is a flowchart demonstrating the operation for writing data in a laser card.

FIG. 48 shows a procedures for using the card. In a card unit, a controller reads data out of the card and, if any unoccupied space is available, writes one page of data and extra data therein and, then, checks the next document. When the documents run out after such a repetitive operation, the controller writes in the final EOF (or NEXT). If no blank space is available, the controller urges the operator to replace the card and, then, effects the above procedure.

Figure 49:
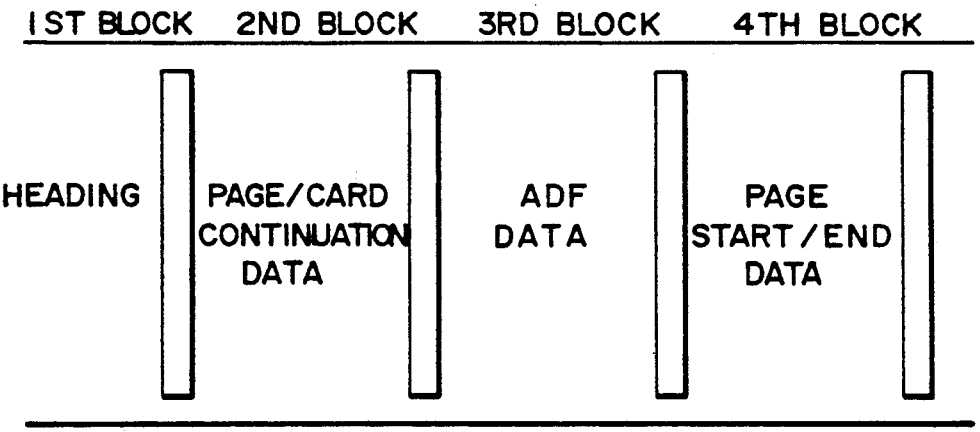
FIGS. 49 to 51 are views each showing a laser card in accordance with the present invention.
Figure 50:
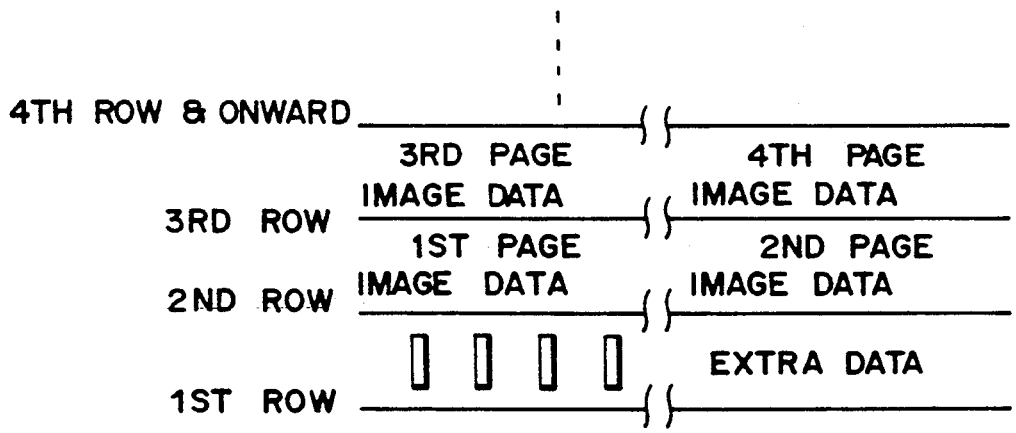
Figure 51:
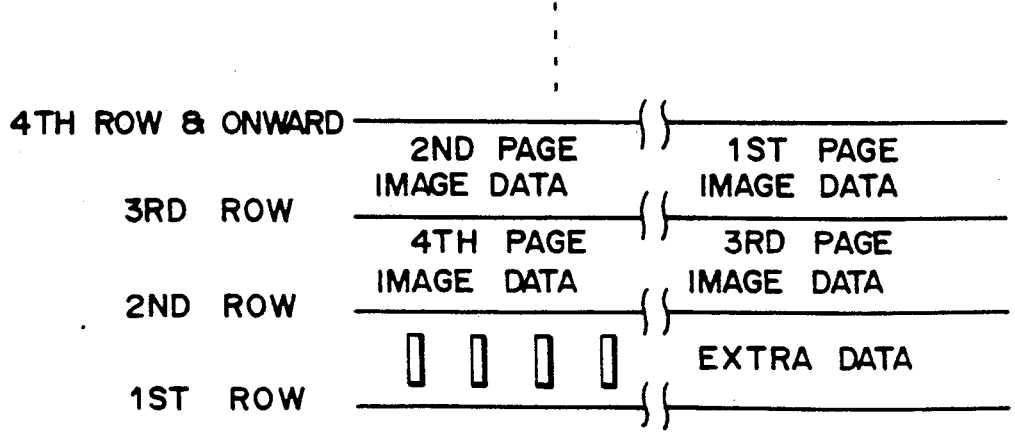

Another embodiment of the present invention is shown in FIG. 49 in which, as in the above-described embodiment, image data are stored in a single laser card together with extra data associated therewith. The heading is adapted for the identification of the card. Page/card continuation data include the number of pages of image data stored, EOF code, and whether the ADF was used. ADF data are indicative of whether the ADF is of the type feeding documents from the first one or from the last one. Further, page start/end position data are indicative of the start and end positions of image data which were sequentially recorded. Recording image data in the card in the same order as reading them by the scanner is usual and desirable for the effective use of the card. It follows that when the first document is fed first, data are stored as shown in FIG. 50 while, when the last document is fed first, they are stored as shown in FIG. 51. In the case that documents are by hand without using the ADF, the system shown in FIG. 50 is more usual than that of FIG. 51.

Even the copier for outputting image data is available in two different configurations, i.e., one which discharges a paper face up and one which discharges it face down. In the case of the face-up type copier, a series of image data cannot be outputted in order of page unless the last page is outputted first. Conversely, in the case of the face-down type copier, it is necessary to output the first page first. Such a procedure is represented by a flowchart in FIG. 52.

Figure 52:
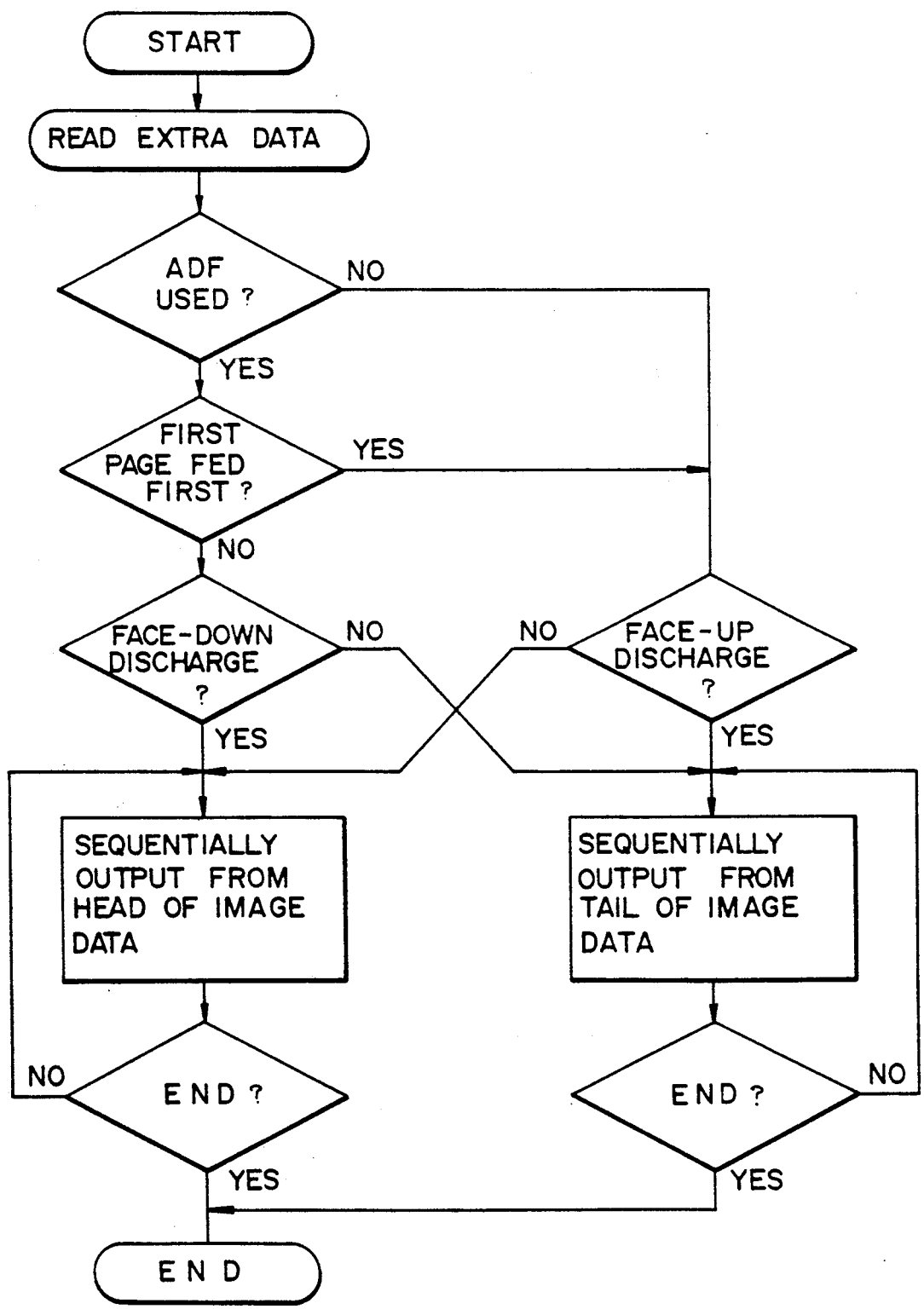
FIG. 52 is a flowchart demonstrating an embodiment of the present invention.

In practice, the CPU (b), or main controller, shown in FIGS. 3A and 3B inputs image data by serial communication with the controller of FIG. 6 and controls the copier according to the flowchart of FIG. 52, whereby image data are automatically outputted in oder page.

As described above, a person is allowed to cause a series of pages to be outputted without any troublesome operation and even if a reading device and an outputting device (i.e. document feed system of ADF and paper discharging system of copier) are different in configuration from each other. When a cover is used in place of the ADF, all that is required is entering EOF on the operation board. Further, when image data is stored with the ADF used, no complicated operations are needed except for registering a heading and replacement of the card.

Various modifications will become possible for those skilled in the art after receiving the teachings of the present disclosure without departing from the scope thereof.

What is claimed is:

1. A digital copier using an external storing medium for storing a document image of an original document, comprising:

inputting means for converting into an electric signal image data which are read by scanning said document image;

recording means for recording image data, which have been converted into said electric signal by said inputting means, by storing said image data in said storing medium, said recording means being constructed to compress said image data; and outputting means for printing out said electric signal to reproduce an image, wherein said recording means is further constructed to compare an amount of said image data and a residual of memory capacity of said storing medium and, if said amount of image data is greater than said residual, stores said image data in said storing medium after reducing said image data in magnification and, if said amount of image data is smaller than said residual, stores said image data without reducing said image data.

2. A digital copier as claimed in claim 1, wherein said recording means is further constructed to record a reduction ratio of said image data reduced.

3. A digital copier as claimed in claim 2, further comprising reproducing means for reproducing said image data recorded in said storing medium.

4. A digital copier as claimed in claim 3, wherein said reproducing means is constructed to expand said image data reduced on the basis of said reduction ratio when said image data are to be reproduced.

5. A digital copier using an external storing medium for storing a document image of an original document, comprising:

inputting means for converting into an electric signal image data which are read by scanning said document image;

recording means for recording image data, which have been converted into said electric signal by said inputting means, by storing said image data in said storing medium; and outputting means for printing out said electric signal to reproduce an image, wherein said storing medium comprises a laser card having a memory residual display zone for displaying the residual of memory capacity.

6. A digital copier as claimed in claim 5, wherein said memory residual display zone is defined in a part of a memory area.

7. A digital copier as claimed in claim 5, wherein said memory residual display zone is defined in a part other than a memory area.

8. A digital copier as claimed in claim 5, further comprising writing means for visualizing said memory residual display zone.

9. A digital copier as claimed in claim 8, wherein said writing means comprises a semiconductor laser.

10. A digital copier as claimed in claim 8, wherein the residual of memory capacity visualized is displayed in terms of the number of papers of a particular size.

11. A digital copier as claimed in claim 8, wherein the residual of memory capacity visualized is displayed in terms of bytes.

12. A digital copier as claimed in claim 8, further comprising alarming means for displaying a message when the amount of said image data is greater than the residual of memory capacity of said laser card.

13. A digital copier as claimed in claim 12, wherein said recording means is constructed to compress said image data.

14. A digital copier as claimed in claim 13, wherein said recording means is further constructed to compare an amount of said image data and a residual of memory capacity of said storing medium and, if said amount of image data is greater than said residual, stores said image data in said storing medium after reducing said image data in magnification and, if said amount of image data is smaller than said residual, stores said image data without reducing said image data.

15. A digital copier as claimed in claim 14, wherein said recording means is further constructed to record a reduction ratio of said image data reduced.

16. A digital copier as claimed in claim 15, further comprising reproducing means for reproducing said image data recorded in said storing medium.

17. A digital copier as claimed in claim 16, wherein said reproducing means is constructed to expand said image data reduced on the basis of said reduction ratio when said image data are to be reproduced.

18. A digital copier as claimed in claim 5, wherein said memory residual display zone is provided with a mark indicative of presence of the next card when said image data cannot be fully accommodated in a single laser card.

* * * * *